(12) United States Patent
Teraoka et al.

(10) Patent No.: US 12,060,911 B2
(45) Date of Patent: Aug. 13, 2024

(54) MESHING CLUTCH MECHANISM AND TWO-SPEED TRANSMISSION

(71) Applicant: IKEYA FORMULA CO., LTD., Kanuma (JP)

(72) Inventors: Masao Teraoka, Sano (JP); Shinji Ikeya, Kanuma (JP)

(73) Assignee: IKEYA FORMULA CO., LTD., Tochigi (JP)

( * ) Notice: Subject to any disclaimer, the term of this patent is extended or adjusted under 35 U.S.C. 154(b) by 0 days.

(21) Appl. No.: 18/039,119

(22) PCT Filed: Nov. 8, 2021

(86) PCT No.: PCT/JP2021/040922
§ 371 (c)(1),
(2) Date: May 26, 2023

(87) PCT Pub. No.: WO2022/113709
PCT Pub. Date: Jun. 2, 2022

(65) Prior Publication Data
US 2024/0003390 A1    Jan. 4, 2024

(30) Foreign Application Priority Data
Nov. 26, 2020 (JP) .................. 2020-206327

(51) Int. Cl.
*F16H 3/089* (2006.01)
*F16D 11/14* (2006.01)
(Continued)

(52) U.S. Cl.
CPC .............. *F16D 23/14* (2013.01); *F16D 11/14* (2013.01); *F16D 13/38* (2013.01); *F16H 3/089* (2013.01);
(Continued)

(58) Field of Classification Search
CPC .......... F16D 23/14; F16D 11/14; F16D 13/38; F16D 2023/123; F16H 3/46; F16H 3/089; F16H 2200/2094; F16H 2200/2064
(Continued)

(56) References Cited

U.S. PATENT DOCUMENTS 4,057,134 A     11/1977  Gatewood
6,290,044 B1 *   9/2001  Burgman .............. F16D 41/125
                                                      192/85.48
(Continued)

FOREIGN PATENT DOCUMENTS

JP      52-145655 A      12/1977
JP     2016-017632 A      2/2016
(Continued)

OTHER PUBLICATIONS

Motor Fan illustrated (corresponding page of a magazine cited in the priority Japanese Application).

*Primary Examiner* — Ha Dinh Ho
(74) *Attorney, Agent, or Firm* — Norris McLaughlin, P.A.

(57) ABSTRACT

A meshing clutch comprises a rotor with a first meshing clutch, a sleeve with a second meshing clutch and a first cam being supported by a clutch hub and urged so as to release meshing, a cam ring configured to convert movement in a rotational direction into movement in an axial direction to lock the meshing according to cooperation of the first and the second cams, and a cam actuator, a sun gear that receives rotation input, an internal gear meshing with the sun gear through a planet pinion, a planet carrier being provided with a drive pinion for output, a fiction clutch mechanism to adjust connection between the internal gear and the planet carrier according to fastening, and a clutch actuator performing fastening control of the friction clutch mechanism.

12 Claims, 12 Drawing Sheets

(51) Int. Cl.
*F16D 13/38* (2006.01)
*F16D 23/12* (2006.01)
*F16D 23/14* (2006.01)
*F16H 3/46* (2006.01)
*F16H 3/64* (2006.01)

(52) U.S. Cl.
CPC ............... *F16H 3/46* (2013.01); *F16H 3/64* (2013.01); *F16D 2023/123* (2013.01); *F16H 2200/0021* (2013.01); *F16H 2200/0034* (2013.01); *F16H 2200/2005* (2013.01); *F16H 2200/201* (2013.01); *F16H 2200/2033* (2013.01); *F16H 2200/2064* (2013.01); *F16H 2200/2094* (2013.01)

(58) Field of Classification Search
USPC .......................................................... 74/325
See application file for complete search history.

(56) References Cited

U.S. PATENT DOCUMENTS

| | | | |
|---|---|---|---|
| 6,505,721 B1* | 1/2003 | Welch | F16D 41/125 192/69.1 |
| 6,931,956 B2* | 8/2005 | Thery | F16D 21/06 74/330 |
| 2002/0170796 A1* | 11/2002 | Fitz | F16D 41/125 192/114 R |
| 2012/0279334 A1* | 11/2012 | Gaully | F16D 11/10 74/333 |
| 2016/0003351 A1 | 1/2016 | Park | |
| 2016/0369873 A1 | 12/2016 | Chae | |
| 2021/0071721 A1 | 3/2021 | Shirosaki et al. | |

FOREIGN PATENT DOCUMENTS

| | | |
|---|---|---|
| JP | 2016-187981 A | 11/2016 |
| JP | 6545921 B | 7/2019 |

* cited by examiner

MESHING CLUTCH MECHANISM AND TWO-SPEED TRANSMISSION

FIELD OF THE INVENTION

The present invention relates to a drive mechanism, in particular, a meshing clutch mechanism and a two-speed transmission.

BACKGROUND OF THE INVENTION

A conventional two-speed transmission as disclosed in Patent document 1 is proposed. The two-speed transmission, in order to reduce the number and the weight of components, keeps rotational speed of a motor using a planetary gear unit at a constant speed or a reduced speed. There is, however, a problem that toque interruption is occurred according to requirement to once remove driving force in gear shifting. On the other hand, a two-speed transmission as disclosed in Patent document 2 is proposed. The two-speed transmission assigns energization and non-energization of an electromagnetic coil to a low-speed stage and a high-speed stage, thereby improving electric power consumption efficiency. Further, an arrangement of a one-way clutch prevents torque interruption at the low-speed to reduce shift shock sensible by a driver. There is, however, a problem that torque in a reverse direction is not transmitted at the low-speed stage owing to the arrangement of the one-way clutch in the two-speed transmission.

PATENT DOCUMENT 1: JP 2016-017632 A
PATENT DOCUMENT 2: JP 6545921 B

SUMMARY OF THE INVENTION

A problem to be solved is that the torque interruption is occurred at the time of gear shifting or the torque in the reverse direction (hereinafter, referred to as coasting torque) is not transmitted at the low-speed stage in the two-speed transmission using the one-way clutch at the low speed to prevent torque interruption.

A meshing clutch mechanism according to the present invention, in order to easily switch between a one-way clutch function and a two-way clutch function of a first and a second meshing clutches, is characterized by comprising a rotor being provided with a first meshing clutch and being rotatably supported, the first meshing clutch having a tooth face to transmit positive torque and a tooth face to transmit negative torque, the tooth face to transmit negative torque angled to release meshing according to the negative torque; a sleeve being provided with a second meshing clutch to mesh with the first meshing clutch and a first cam for the meshing, being urged so as to release the meshing, and engaging with a clutch hub in a rotational direction and being supported on the clutch hub movably in an axial direction, the clutch hub being fixed on a case, a retaining member urging the sleeve to keep a releasing position between the first and the second meshing clutches, a cam ring being provided with a second cam engaging with the first cam and being configured to convert movement in the rotational direction into movement in the axial direction to be transmitted to the sleeve and lock the meshing according to cooperation of the first and the second cams, the locking releasable by rotationally driving the cam ring, and a cam actuator that rotationally drives the cam ring.

The present invention, in order to transmit torque in a reverse direction at a low-speed stage, is characterized by a two-step transmission using the meshing clutch mechanism, comprising a sun gear that receives rotation input, an internal gear meshing with the sun gear through a planet pinion and forming the rotor, a planet carrier being supported rotatably relatively to the internal gear, rotatably supporting the planet pinion, and being provided with a drive pinion for output, a fiction clutch mechanism interposed between the internal gear and the planet carrier to adjust connection between the internal gear and the planet carrier according to fastening, and a clutch actuator that adjusts frictional torque of the connection according to fastening control of the friction clutch mechanism.

The meshing clutch mechanism according to the present invention easily switches between a one-way clutch function and a two-way clutch function of the first and the second meshing clutches.

The two-speed transmission according to the present invention allows torque transmission in both directions of driving and coasting at the time of a low-speed stage. In a case of used to an electric vehicle, reverse torque transmission is allowed at the time of reversing and energy regenerating. With the one-way clutch function, no torque interruption is occurred at the time of gear shifting to an upper stage. The smooth gear shifting is enabled. At the time of activity at the upper stage, no loss due to drag torque is occurred in the meshing clutch mechanism at the low-speed stage unlike a friction clutch and efficiency is improved.

EMBODIMENT FOR CARRYING OUT THE INVENTION

Figure 1:
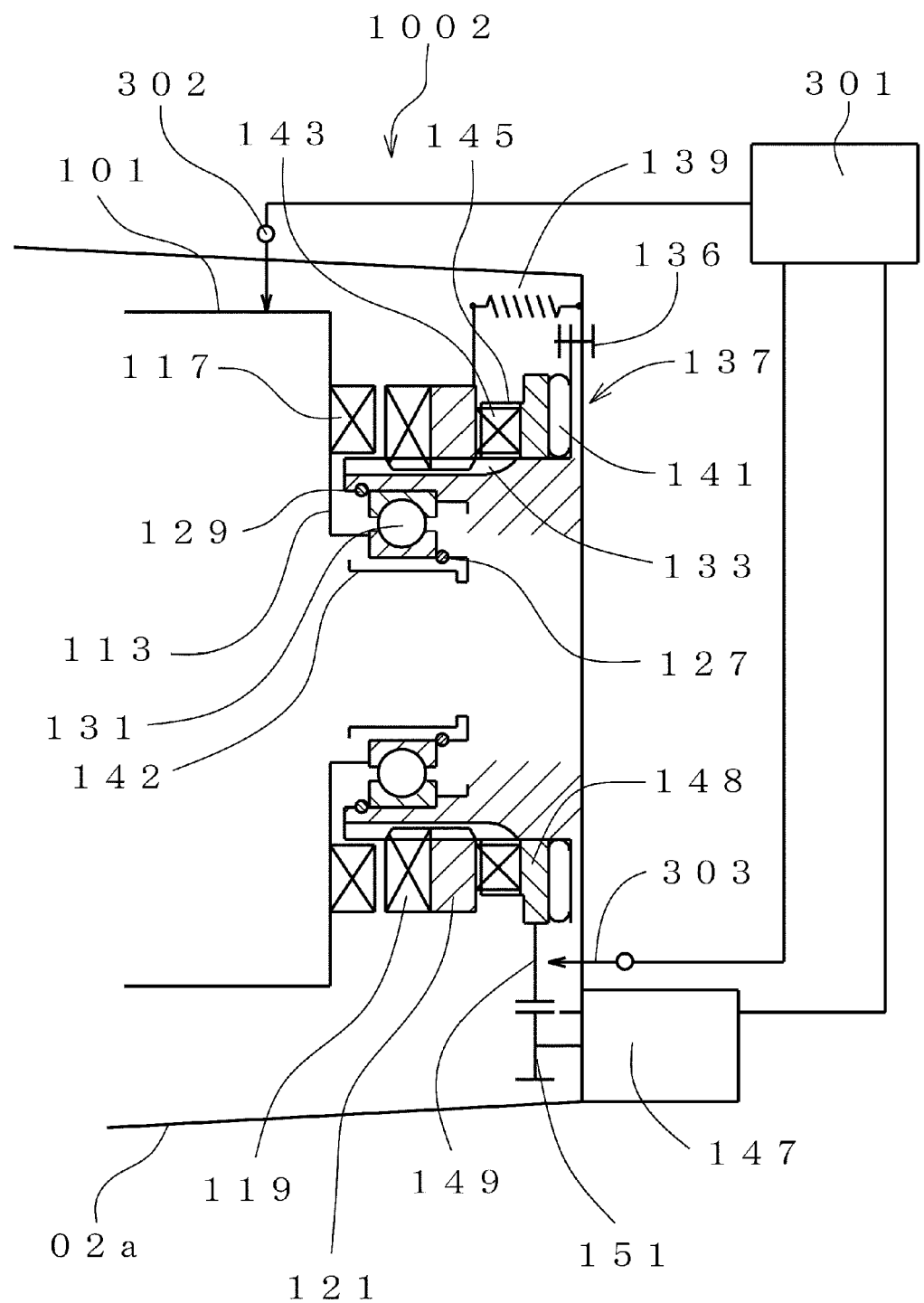
FIG. 1 is a schematic skeleton sectional view of a meshing clutch mechanism with partial omission according to an embodiment 1.

The meshing clutch mechanism of the present invention is realized as follows in order to easily switch between a one-way clutch function and a two-way clutch function of a first and a second meshing clutches.

The meshing clutch mechanism is realized by comprising a rotor being provided with a first meshing clutch and being rotatably supported, the first meshing clutch having a tooth face to transmit positive torque and a tooth face to transmit the negative torque, the tooth face to transmit negative torque angled to release meshing according to the negative torque, a sleeve being provided with a second meshing clutch to mesh with the first meshing clutch and a first cam for the meshing, being urged so as to release the meshing, and engaging with a clutch hub in a rotational direction and being supported by the clutch hub movably in an axial direction, the clutch hub being fixed on a case, a retaining member urging the sleeve to keep a releasing position between the first and the second meshing clutches, a cam ring being provided with a second cam engaging with the first cam and being configured to convert movement in the rotational direction into movement in the axial direction to be transmitted to the sleeve and lock the meshing according to cooperation of the first and the second cams, the locking releasable by rotationally driving the cam ring, and a cam actuator that rotationally drives the cam ring.

The meshing clutch mechanism may be realized by comprising a rotor being provided with a first meshing clutch and being rotatably fitted and supported to a torque transmission shaft being provided with a clutch hub, the first meshing clutch having a tooth face to transmit positive torque and a tooth face to transmit the negative torque, the tooth face to transmit negative torque angled to release meshing according to the negative torque, a sleeve being provided with a second meshing clutch to mesh with the first meshing clutch, being urged so as to release the meshing, and engaging with the clutch hub in a rotational direction and being supported by the clutch hub movably in an axial direction, a retaining member urging the sleeve to keep a releasing position of the meshing between the first and the second meshing clutches, a cam member being rotatably fitted to the clutch hub and being supported by the clutch hub movably in the axial direction, being provided with a first cam for the meshing, being arranged adjacent to the sleeve so as to be rotatable relatively to the sleeve and transmit an axial force to the sleeve, and un-rotatably engaging with a case, a cam ring being provided with a second cam engaging with the first cam, being arranged to face the cam member, being supported rotatably relatively to the clutch hub, and being prevented from separating movement relative to the cam member in the axial direction, to convert movement in the rotational direction into movement in the axial direction to be transmitted to the cam member and lock the meshing according to cooperation of the first and the second cams, the locking releasable by rotationally driving the cam ring, and a cam actuator that rotationally drives the cam ring.

A two-speed transmission of the present invention, in order to prevent torque interruption at the time of gear shifting and transmit reverse torque at a low-speed, is a two-speed transmission using the meshing clutch mechanism and is realized by comprising a sun gear that receives rotation input, an internal gear meshing with the sun gear through a planet pinion and forming the rotor, a planet carrier being supported rotatably relatively to the internal gear, rotatably supporting the planet pinion, and being provided with a drive pinion for output, a fiction clutch mechanism being interposed between the internal gear and the planet carrier to adjust connection between the internal gear and the planet carrier according to fastening, and a clutch actuator that adjusts frictional torque of the connection according to fastening control of the friction clutch mechanism.

The two-step transmission using the meshing clutch mechanism may be realized by comprising a sun gear that receives rotation input through a sun gear shaft, a third sun gear shaft being rotatably supported to the sun gear shaft and being provided with a third sun gear and a drive pinion for output, a planet pinion being integrally provided with a first gear meshing with the sun gear and a second gear meshing with the third sun gear, a planet carrier rotatably supporting the planet pinion and forming the rotor, a fiction clutch mechanism being interposed between the third sun gear shaft and the planet carrier to adjust connection between the third sun gear shaft and the planet carrier according to fastening, and a clutch actuator that adjusts frictional torque of the connection according to the fastening of the friction clutch mechanism.

The two-step transmission using the meshing clutch mechanism may be realized by that the rotation input to the sun gear is performed through a drive gear and a driven gear from a motor.

The two-speed transmission using the meshing clutch mechanism may be realized by further comprising a pressing force adjustment means between the clutch actuator and the friction clutch mechanism to conduct the fastening, wherein the pressing force adjustment means comprises a first differential gear and a second differential gear being supported rotatably relatively to each other and being different from each other in number of teeth, a torque cam that converts relative rotation between the first differential gear and the second differential gear into axial thrust, a clutch pinion meshing with the first differential gear and the second differential gear and receiving rotation input from the clutch actuator, and a pressing member that receives the axial thrust converted by the torque cam to conduct the fastening.

The two-speed transmission using the meshing clutch mechanism may be realized by further comprising a pressing force adjustment means between the clutch actuator and the friction clutch mechanism to conduct the fastening, wherein the pressing force adjustment means comprises a first differential gear and a second differential gear being supported rotatably relatively to each other and being different from each other in number of teeth, a torque cam that converts relative rotation between the first differential gear and the second differential gear into axial thrust, a clutch pinion meshing with the first differential gear and the second differential gear and receiving rotation input from the clutch actuator, an elastic body generating pressing force for the fastening, and a pressing force adjustment body that receives the pressing force of the elastic body to conduct the fastening and receives the axial thrust converted by the torque cam to reduce the pressing force of the elastic member.

A two-speed transmission using the meshing clutch mechanism may be realized by comprising an input shaft being provided with a low-speed drive gear and a high-speed drive gear and being configured to receive rotation input, an output shaft being provided with a low-speed driven gear meshing with the low-speed drive gear, a high-speed driven gear meshing with the high-speed drive gear, and a drive pinion for output, the input shaft or the output shaft forming the torque transmission shaft, in a case of the input shaft forming the torque transmission shaft, the low-speed drive gear forming the rotor and the low-speed driven gear being fixed to the output shaft, in a case of the output shaft forming the torque transmission shaft, the low-speed driven gear forming the rotor and the low-speed drive gear being fixed to the input shaft, a friction clutch mechanism that adjusts connection between the input shaft and the high-speed drive gear being provided rotatably on the input shaft or that adjusts connection between the output shaft and the high-speed driven gear being provided rotatably on the output shaft, and a clutch actuator that adjusts frictional torque of the connection according to fastening control of the friction clutch mechanism.

The two-speed transmission using the meshing clutch mechanism may be realized by further comprising a pressing force adjustment means between the clutch actuator and the friction clutch mechanism to conduct the fastening, wherein the pressing force adjustment means comprises an elastic body that generates pressing force for the fastening, and a pressing force adjustment member being connected to the clutch actuator and being configured to receive the pressing force of the elastic body to conduct the fastening, wherein the clutch actuator drives the pressing force adjustment member to adjust the pressing force of the elastic body.

The two-step transmission using the meshing clutch mechanism may be realized by comprising a sun gear that receives rotation input, an internal gear meshing with the sun gear through a planet pinion and forming the rotor, a planet carrier being supported rotatably relatively to the internal gear and rotatably supporting the planet pinion, a fiction clutch mechanism being interposed between the internal gear and the planet carrier to adjust connection between the internal gear and the planet carrier according to fastening, a clutch actuator that adjusts frictional torque of the connection according to fastening control of the friction clutch mechanism, and an output shaft being connected to the planet carrier and being arranged so as to be protruded outside.

The two-step transmission using the meshing clutch mechanism may be realized by comprising a sun gear that receives rotation input, a third sun gear being provided with an output shaft being arranged so as to be protruded outside, a planet pinion being integrally provided with a first gear meshing with the sun gear and a second gear meshing with the third sun gear, a planet carrier rotatably supporting the planet pinion forming the rotor, a fiction clutch mechanism being interposed between the sun gear and the planet carrier to adjust connection between the sun gear and the planet carrier according to fastening, and a clutch actuator that adjusts frictional torque of the connection according to the fastening of the friction clutch mechanism.

The two-speed transmission using the meshing clutch mechanism may be realized by further comprising a sensor that detects a slip of the friction clutch mechanism, and a controller that controls the clutch actuator according to the detected slip.

Figure 2:
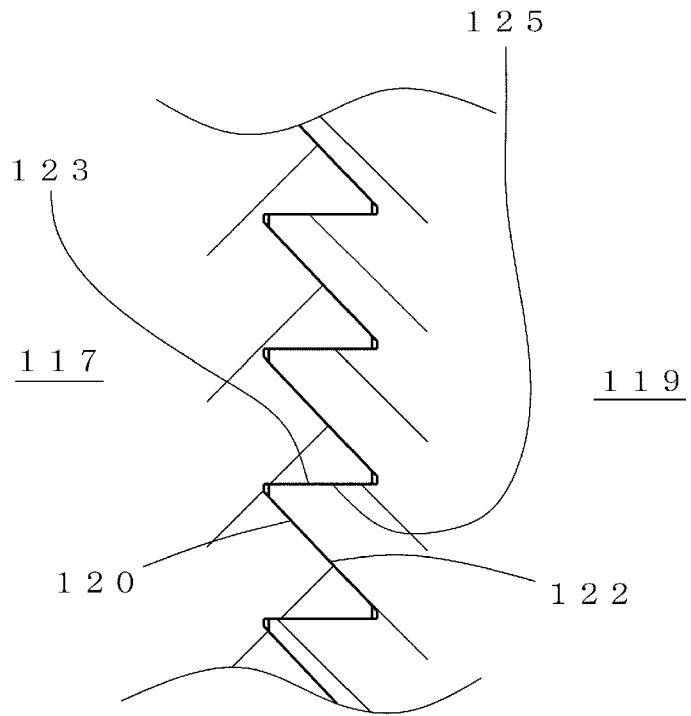
FIG. 2 is a development sectional view of essential part of a first and a second meshing clutches in a circumferential direction according to the embodiment 1.
Figure 3:
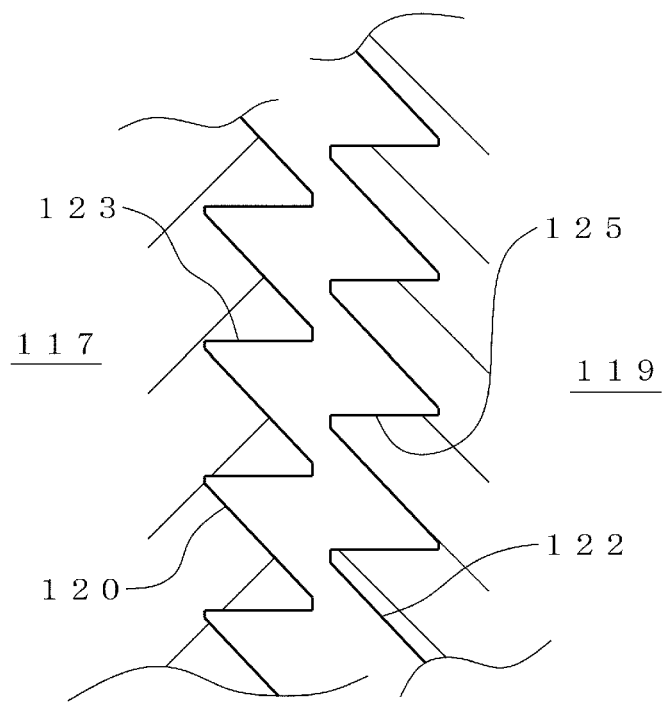
FIG. 3 is a development sectional view of the essential part in the circumferential direction in a state that the first and the second meshing clutches are separated according to the embodiment 1.
Figure 4:
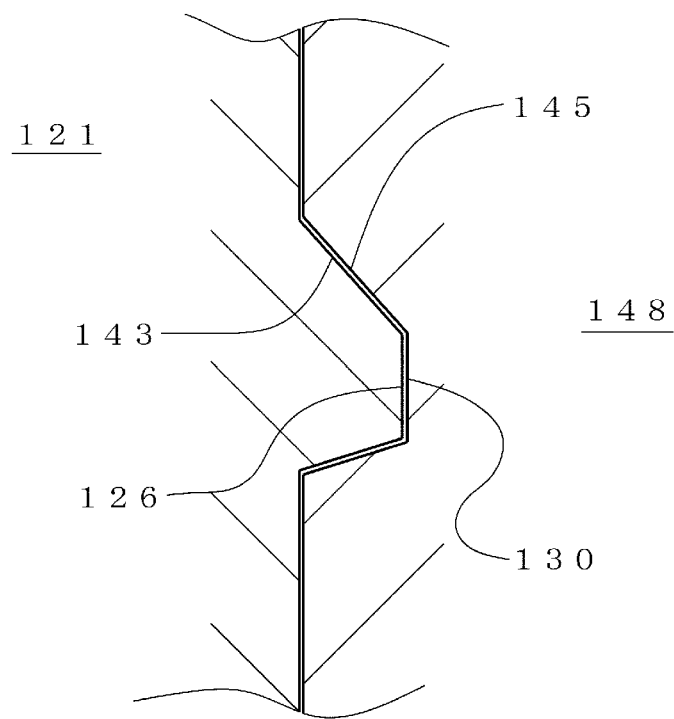
FIG. 4 is a development sectional view of essential part of a first and a second cams in the circumferential direction according to the embodiment 1.
Figure 5:
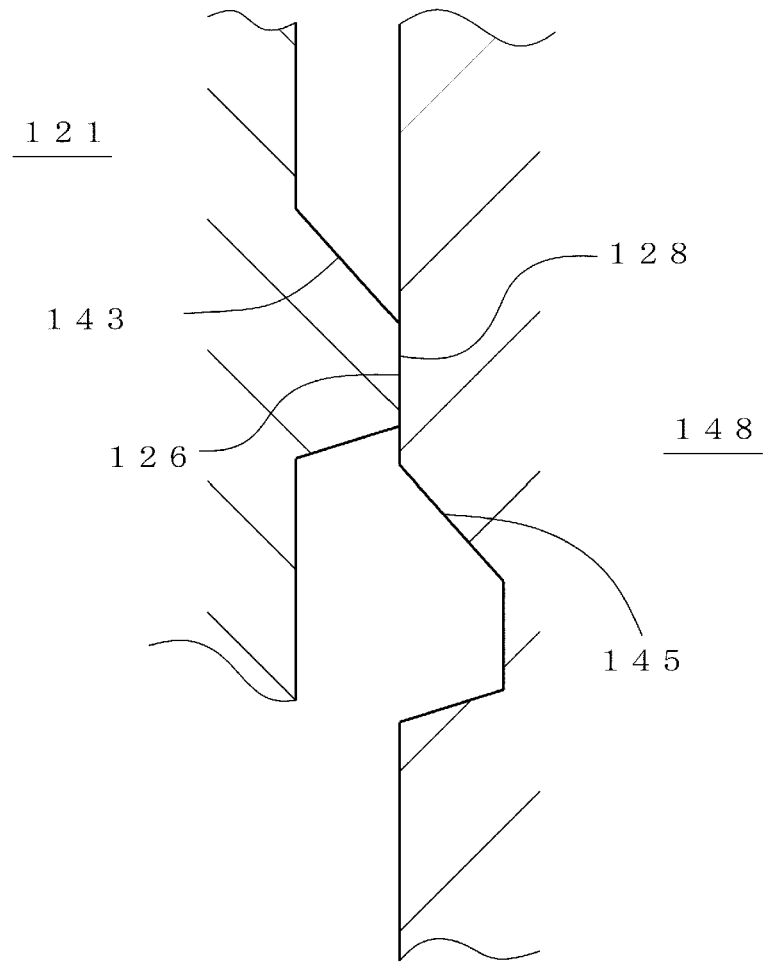
FIG. 5 is a development sectional view of the essential part in the circumferential direction at the time of the first and the second cams operating according to the embodiment 1.
Figure 6:
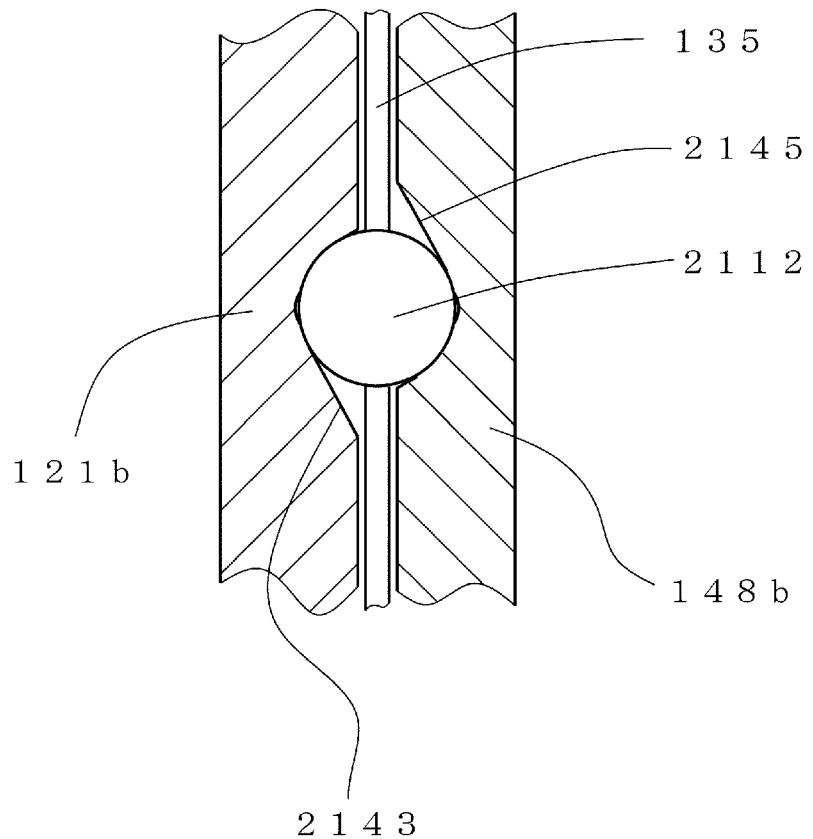
FIG. 6 is a development sectional view of essential part of a first and a second cams formed by a ball cam in the circumferential direction according to the embodiment 1.
Figure 7:
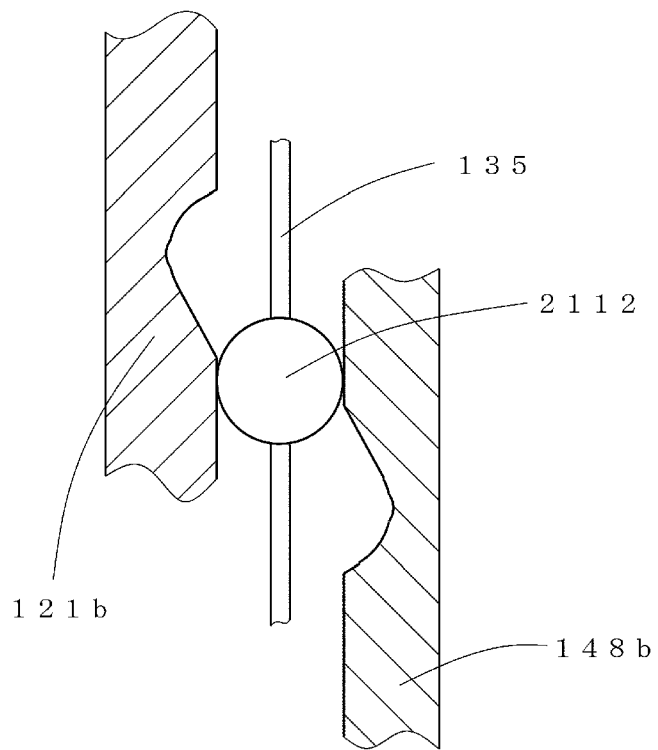
FIG. 7 is a development sectional view of the essential part in the circumferential direction at the time of the first and the second cams formed by the ball cam operating according to the embodiment 1.

FIG. 1 is a schematic skeleton sectional view of a meshing clutch mechanism with partial omission according to the embodiment 1. FIG. 2 is a development sectional view of essential part of a first and a second meshing clutches in a circumferential direction. FIG. 3 is a development sectional view of the essential part in the circumferential direction in a state that the first and the second meshing clutches are separated. FIG. 4 is a development sectional view of essential part of a first and a second cams in the circumferential direction. FIG. 5 is a development sectional view of the essential part in the circumferential direction at the time of the first and the second cams operating. FIG. 6 is a development sectional view of essential part of a first and a second cams formed by a ball cam in the circumferential direction. FIG. 7 is a development sectional view of the essential part in the circumferential direction at the time of the first and the second cams formed by the ball cam operating.

A first meshing clutch mechanism 1002 being the meshing clutch mechanism illustrated in FIG. 1 is provided with a first rotor 101 being a rotor, a first sleeve 121 being a sleeve, a retaining member 139, a cam ring 148, and a cam actuator 147. The first meshing clutch mechanism 1002 is provided with a first clutch hub 133 as a clutch hub provided on a clutch holder 137, a first meshing clutch 117 and a second meshing clutch 119.

The clutch holder 137 is fixed to a case 02a using a fastening member 136 such as a bolt and a nut. The first clutch hub 133 has a base portion integrally connected on an inner peripheral side of the clutch holder 137. The first clutch hub 133 is extended toward the first rotor 101 in an axial direction. On an outer peripheral face of the first clutch hub 133, splines are formed for example.

The first meshing clutch 117 is fastened or integrally formed to the first rotor 101. On an inner peripheral side of the first rotor 101, a first boss 142 is provided so as to be extended to an inner diametral portion of the first clutch hub 133 in the axial direction. The first boss 142 is rotatably supported on the inner diametral portion of the first clutch hub 133 through a bearing 131 such as a ball bearing. The bearing 131 has an inner race and an outer race, the inner race axially positioned and fixed on the first boss 142 and the outer race on the first clutch hub 133. The positioning and fixing is performed by a boss-fastening member 127 and a hub-fastening member 129 such as stopper rings attached to the first boss 142 and the first clutch hub 133.

The first sleeve 121 is provided with a second meshing clutch 119 that meshes with the first meshing clutch 117 and a first cam 143 for the meshing. The first sleeve 121 is urged so as to release the meshing of the second meshing clutch 119 with the first meshing clutch 117. The first sleeve 121 engages with and axially movably supported on the first clutch hub 133 as a clutch hub fixed on the case 02a in a rotational direction.

For more details, the second meshing clutch 119 is provided on one side face of the first sleeve 121. The second meshing clutch 119 is arranged so as to meshably face the first meshing clutch 117. The second meshing clutch 119 engages with an outer periphery of the first clutch hub 133 together with the first sleeve 121. The first sleeve 121 is provided with a first cam 143 on the other side face.

The first sleeve 121 is supported on the case 02a by the retaining member 139 such as a tension coil spring. The retaining member 139 functions to urge the first sleeve 121 and retain the first and the second meshing clutches 117 and 119 on a position releasing the first and the second meshing clutches as mentioned above. The retaining member 139 may have a structure using a check ball or the like.

The cam ring 148 is provided with a second cam 145 engaging with the first cam 143. With cooperation of the first and the second cams 143 and 145, the cam ring is configured to convert movement in the rotational direction into movement in the axial direction to be transmitted to the first sleeve 121 and lock the meshing, the locking releasable by rotationally driving the cam ring.

The cam ring 148 is rotatably supported on an outer periphery of the base portion of the clutch holder 137. On one side face of the cam ring 148, the second cam 145 is provided. The second cam 145 meshes with or faces the first cam 143. On the other side face of the cam ring 148, a bearing 141 is interposed between the clutch holder 137 and the other side face of the cam ring. The bearing 141 is to receive axial force generated at the cam ring 148 with respect to the clutch holder 137.

The cam ring 148 has an outer peripheral portion to which a rotated means 149 such as a circular or sector gear is fixed. The rotated means 149 has concavo-convex grooves or the like as a detected means. The grooves or the like are detected by a side sensor 303 and a detected signal is input to a controller 301.

The cam ring 148 is configured to be rotationally driven by the cam actuator 147 such as an electric motor. The cam actuator 147 is fastened and fixed to the case 02a using bolts and nuts or the like. The cam actuator 147 has an output shaft to which a drive pinion 151 is attached in the case 02a. The drive pinion 151 meshes with the rotated means 149.

Here, as illustrated in FIGS. 2 and 3, the first and the second meshing clutches 117 and 119 have tooth faces to transmit positive torque and tooth faces to transmit negative torque, the tooth faces to transmit negative torque angled to release the meshing according to the negative torque.

The tooth faces 123 and 125 of the first and the second meshing clutches 117 and 119 are to transmit positive torque such as driving torque, and the tooth faces 123 and 125 are substantially parallel to or slightly angled to a rotational axis.

The tooth faces 120 and 122 of the first and the second meshing clutches 117 and 119 are to transmit negative torque such as reverse torque relative to the driving torque (hereinafter, referred to as coasting torque). The tooth faces 120 and 122 has pressure angles (angles relative to the rotational axis) larger than friction angles.

FIG. 4 is a development sectional view of essential part in the circumferential direction. FIG. 5 is a development sectional view of the essential part in the circumferential direction at the time of the first and the second cams operating. FIG. 4 is a drawing when concavities and convexities of the first cam 143 and the second cam 145 mesh with each other, and FIG. 5 is a drawing when the convexities 126 of the first cam 143 abut against convex flats 128 of the second cam 145.

When forcibly retaining a state in which the first meshing clutch 117 and the second meshing clutch 119 mesh with each other, the cam operation works as illustrated FIG. 5. Namely, the first cam 143 and the second cam 145 separate away from each other along cam slopes. The convexities 126 of the first cam 143 and the convex flats 128 of the second cam 145 are positioned to contact with each other. The cam operation works by controlling the cam actuator 147 using the controller 301 illustrated in FIG. 1. With the control of the controller 301, the cam actuator 147 drives the drive pinion 151 to rotate the rotated means 149. With the rotation of the rotated means 149, the cam ring 148 rotates to work the cam operation.

In this case, the cam actuator 147 is driven and controlled as the controller 301 receives a shift command. With the driving and controlling, the cam ring 148 is rotationally driven through the drive pinion 151 and the rotated means 149. At this time, the sensor 303 detects a phase of the rotated means 149 and sends it to the controller 301. Through the sending, the cam ring 148 takes a given phase.

When the coasting torque is applied between the first and the second meshing clutches 117 and 119, the tooth faces 120 to transmit the coasting torque are brought into contact with the tooth faces 122 to receive the coasting torque. The first and the second meshing clutches 117 and 119 generate thrust in a direction separating away from each other according to operation of the pressure angles.

In the first sleeve 121 having the second meshing clutch 119, the first cam convexities 126, however, abut against the second cam convex flats 128. Accordingly, the first sleeve 121 cannot moves in a separating direction. Further, the first rotor 101 having the first meshing clutch 117 is fixed by the bearing 131, the boss-fastening member 127, and the hub-fastening member 129 in the axial direction and cannot move in the axial direction.

Accordingly, the meshing between the first and the second meshing clutches 117 and 119 is kept during the application of the coasting torque. In that time, the first meshing clutch mechanism 1002 is allowed to transmit torque in both directions of the driving and the coasting as mentioned above. Hereinafter, the function is referred to as the two-way clutch function. According to the two-way clutch function is obtained, the first and the second cams 143 and 145 form a lock means.

On the other hand, rotational phases of the convexities 126 of the first cam 143 match those of concave flats 130 of the second cam 145 as illustrated in FIG. 4 by, for example, returning rotational position of the cam ring 148 with the driving of the cam actuator 147. This releases the restriction of the movement of the first sleeve 121 in the axial direction due to the cam operation. In this state, when applying driving torque to the first and the second meshing clutches 117 and 119, the meshing between the first and the second meshing clutches is kept.

In contrast, when applying coasting torque to the second meshing clutch 119, the first sleeve 121 moves on the first clutch hub 133 in the axial direction to release the first and the second meshing clutches 117 and 119. With this movement, the meshing between the first and the second meshing clutches 117 and 119 is released. The retaining member 139 retains the first sleeve 121 on a releasing position of the first and the second meshing clutches 117 and 119. In this way, the first meshing clutch mechanism 1002 obtains the one-way clutch function.

FIG. 6 is a development sectional view of essential part of a first and a second cams formed by a ball cam in the circumferential direction. FIG. 7 is a development sectional view of the essential part in the circumferential direction at the time of the first and the second cams formed by the ball cam operating.

As illustrated in FIGS. 6 and 7, a first cam groove 2143 composing the first cam is formed on a first cam member 121b and a second cam groove 2145 composing the second cam is formed on a cam ring 148b. Between the first cam groove 2143 and the second cam groove 2145, a rolling body 2112 is engaged and arranged. The rolling body 2112 is retained by a retainer 135. The rolling body 2112 forms the first cam together with the first cam groove 2143 and the second cam together with the second come groove 2145.

The cam ring 148b, therefore, rotates according to the driving of the cam actuator 147 similarly to the above so that the rolling body 2112 runs on the first and the second cam grooves 2143 and 2145 as illustrated in FIG. 6, thereby working cam operation similarly to the above. Rotational phases of the first and the second cam grooves 2143 and 2145 are matched as illustrated in FIG. 5 by, for example, returning the rotational position of the cam ring 148b with the driving of the cam actuator 147, so that the restriction of the movement of the first sleeve 121 in the axial direction due to the cam operation is released.

This modification reduces load of the cam actuator 147 that drives the cam ring 148b.

The tooth faces 123 and 125 of the first and the second meshing clutches 117 and 119 to receive the driving torque have the pressure angles similar to those of the tooth faces 120 and 122 to receive the coasting torque. Namely, the pressure angles of the tooth faces 123 and 125 may be more than the friction angles relative to the rotational axis. This is because that the axial movement of the first sleeve 121 can be blocked by the cam operation of the cam ring 148.

In this way, the present embodiment easily switches the meshing clutch mechanism 1002 between the one-way clutch function and the two-way clutch function with the simple mechanism. Further, since the meshing clutches are used for the torque transmission, the torque transmission is secured and has large quantity torque.

Figure 8:
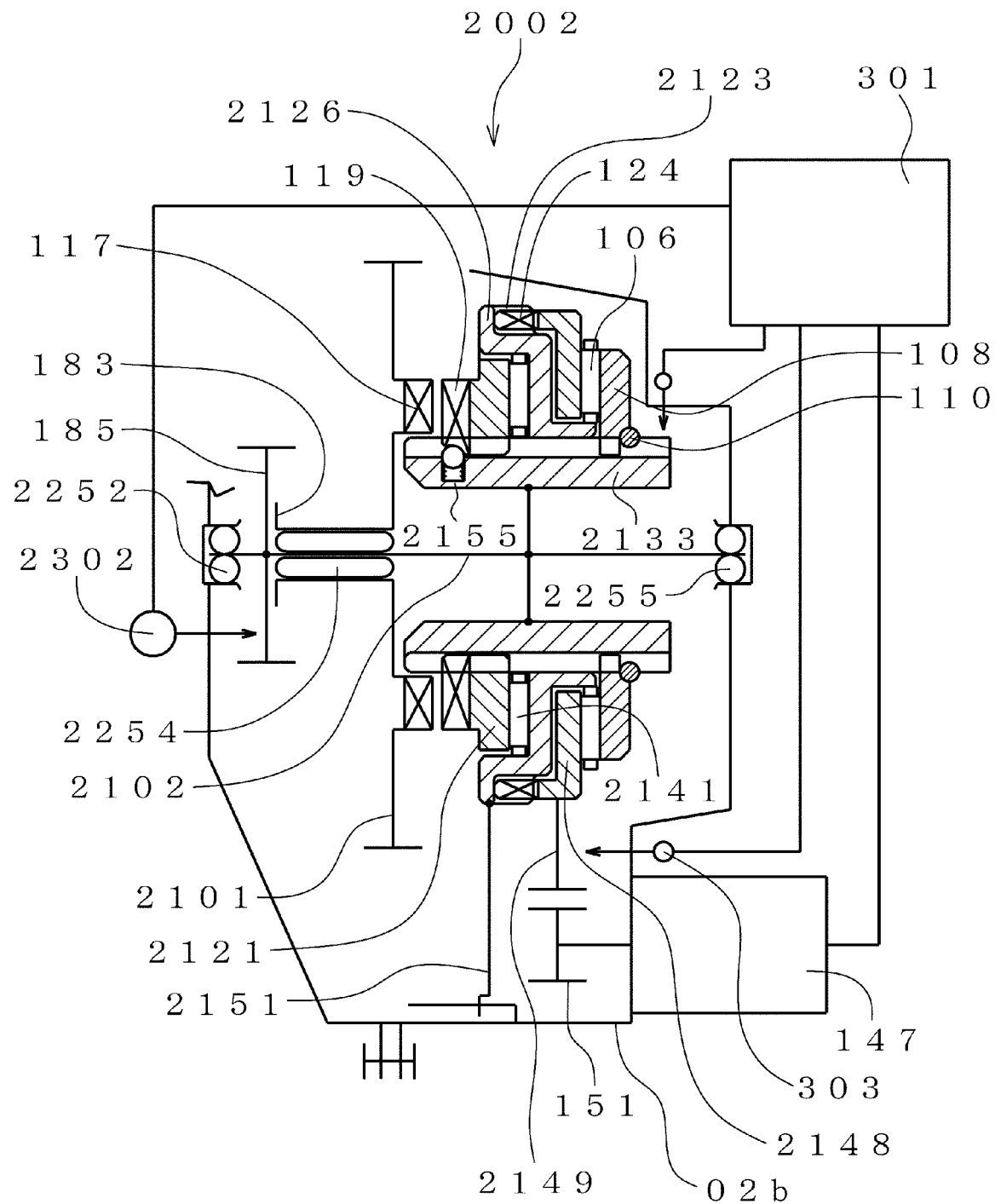
FIG. 8 is a schematic skeleton sectional view of a meshing clutch mechanism with partial omission according to an embodiment 2.

FIG. 8 is a schematic skeleton sectional view of a meshing clutch mechanism with partial omission according to the embodiment 2. It should be noted that components being identical or corresponding to those of the embodiment 1 are represented with the same reference numerals to omit duplicate explanation.

As illustrated in FIG. 8, a second meshing clutch mechanism 2002 being a meshing clutch mechanism according to the embodiment 2 is provided with a second rotor 2101 being a rotor, a second sleeve 2121 as a sleeve, a cam member 2126, a second cam ring 2148 being a cam ring, and a cam actuator 147. Further, the second meshing clutch mechanism 2002 is provided with a second clutch hub 2133, a first and a second meshing clutches 117 and 119.

The second rotor 2101 is provided integrally with the first meshing clutch 117. The second rotor 2101 is configured to be fitted and supported rotatably to a torque transmission shaft 2102 through a bearing 2254. The torque transmission shaft 2102 is provided with the second clutch hub 2133 being a clutch hub.

The second sleeve 2121 is provided with the second meshing clutch 119 configured to mesh with the first meshing clutch 117. The second sleeve 2121 is urged by a retaining member 2155 so as to release meshing between the first and the second meshing clutches 117 and 119 similar to the embodiment 1. The retaining member 2155 of the second embodiment is configured to have a ball protruded and urged by a coil spring, and a slanted face. The ball protruded and urged by the coil spring is supported by a hole of a second clutch hub 2133 in a radial direction. The slanted face is formed on an inner periphery of the second meshing clutch 119. It is configured that the ball protruded and urged by the coil spring resiliently contacts the slanted face. The second sleeve 2121 is engaged with the second clutch hub 2133 in a rotational direction using spline-fitting or the like and is supported movably in an axial direction.

The cam member 2126 is provided with a first cam 2123 to lock the meshing. The cam member 2126 is fitted relatively rotatably to and axially movably supported on the second clutch hub 2133. The cam member 2126 is arranged adjacent to the second sleeve 2121 through a bearing 2141 so as to be allowed to rotate relatively to and transmit axial force to the second sleeve. On an outer diametral portion of the cam member 2126, a cam-member-rotation preventing means 2151 engaging with a case 02b is provided. The cam member 2126 un-rotatably engages with the case 02b using the cam-member-rotation preventing means 2151 and is only movable in the axial direction.

The second cam ring 2148 is provided with a second cam 124 that engages with the first cam 2123. The structures of the first cam 2123 and the second cam 124 are the same as of the first cam 143 and the second cam 145 of the embodiment 1 and are configured as illustrated in FIGS. 4-7.

The second cam ring 2148 is arranged to face the cam member 2126 and is rotatable relatively to the second clutch hub 2133. The second cam ring 2148 is prevented from moving away from the cam member 2126 in the axial direction using a stopper ring 108 through a bearing 106. The stopper ring 108 is positioned on the second clutch hub 2133 using a second hub fastening member 110 such as c-clip. The stopper ring 108 may be formed integrally with the second clutch hub 2133. The second cam ring 2148 causes the first and the second cams 2123 and 124 to cooperate with each other and convert movement in the rotational direction into movement in the axial direction. The converted movement in the axial direction is transmitted to the cam member 2126. It is configured that the cam member 2126 moves with this transmission to lock the meshing releasably by rotationally driving.

Even in the embodiment 2, the second cam ring 2148 is provided with a rotated means 2149 similar to the embodiment 1, and is configured to be connected with the cam actuator 147 through a drive pinion 151. The second cam ring 2148 is configured to be rotationally driven by the cam actuator 147.

The torque transmission shaft 2102 is rotatably supported by the case 02b through bearings 2252 and 2255. The second clutch hub 2133 is fixed to or formed integrally with the torque transmission shaft 2102. The second rotor 2101 is rotatably supported by the torque transmission shaft 2102 through a bearing 2254.

The first clutch hub 133 of the embodiment 1 is fixed to the case 02a and is stationary. In contrast, the second clutch hub 2133 of the embodiment 2 is fastened and fixed to the torque transmission shaft 2102 to rotate integrally with the torque transmission shaft.

As FIG. 5 mentioned in the embodiment 1, when the cam operation works in the state that the first and the second meshing clutches 117 and 119 mesh with each other, the meshing of the second meshing clutch 119 with the first meshing clutch 117 is not released.

Namely, even when coasting torque acts between the first and the second meshing clutches 117 and 119, the second sleeve 2121 does not move in a direction to release the second meshing clutch 119 from the first meshing clutch 117. Further, an end portion 183 of the second rotor 2101 having the first meshing clutch 117 contacts with a transmission member 185 of the torque transmission shaft 2101 and accordingly does not move in the axial direction. The connection between the first and the second meshing clutch 117 and 119 is, therefore, kept.

If the coasting torque is generated between the first and the second meshing clutches 117 and 119, axial thrust is generated on the second sleeve 2121. The axial thrust is transmitted to the torque transmission shaft 2102 via the second clutch hub 2133 through the stopper ring 108 and the second hub fastening member 110 using the bearing 106 and 2141. Further, axial force or reaction force of the first meshing clutch 117 is transmitted to the torque transmission shaft 2102 via the second rotor 2101, the end portion 183, and the transmission member 185 and is absorbed as internal force of the torque transmission shaft 2102. Accordingly, load caused by the thrust of the first and the second meshing clutches 117 and 119 is not applied to the bearings 2252 and 2255 supporting the torque transmission shaft 2102 to the case 02b, and rotational loss and abrasion are not promoted.

As mentioned in the embodiment 1, in a case that the second cam ring 2148 is rotated to put the first cam convexities 126 and the second cam concave flats 130 in the same phase positions, when the coasting torque acts on the first and the second meshing clutches 117 and 119, the connection of the first and the second meshing clutches 117 and 119 is released. Further, the retaining member 2155 urges the second sleeve 2102 to retain a releasing position of the second meshing clutch 119.

As mentioned above, according to the embodiment 2, the second cam ring 2148 is rotated, thereby to switch between the one-way clutch function and the two-way clutch function of the second meshing clutch mechanism 2002.

It should be noted that, when a controller 301 receives a shift command, the cam actuator 147 is driven so that a sensor 303 detects the phase of the second cam ring 2148 similar to the embodiment 1. The detecting signal is sent to the controller 301, whereby the cam ring 148 takes a given phase.

Figure 9:
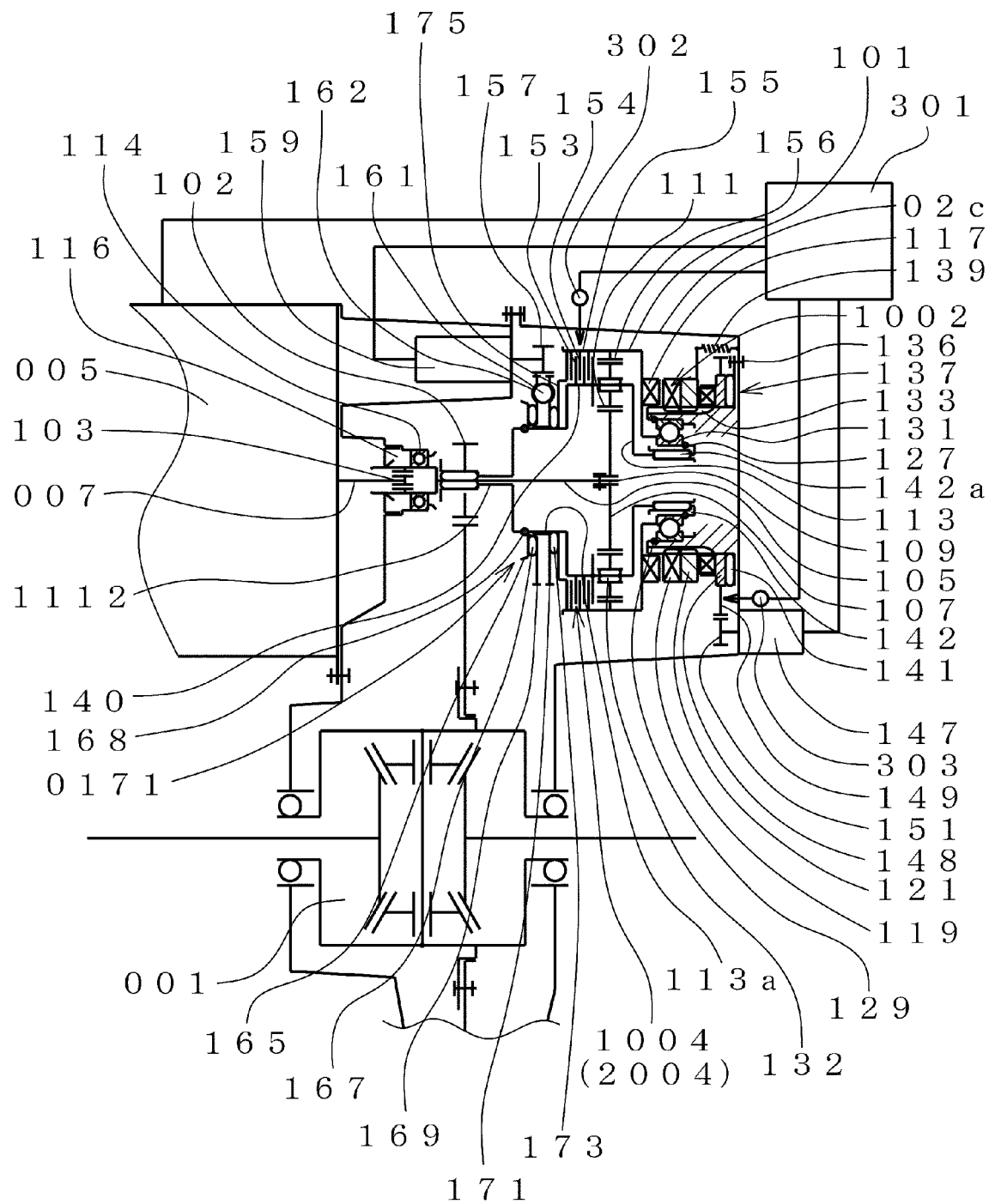
FIG. 9 is a schematic skeleton sectional view of a two-speed transmission with partial omission according to an embodiment 3.

FIG. 9 is a schematic skeleton sectional view of a two-speed transmission with partial omission according to the embodiment 3.

As illustrated in FIG. 9, the embodiment 3 configures a two-speed transmission using the first meshing clutch mechanism 1002 of the embodiment 1. Components being identical or corresponding to those of the embodiment 1 are, therefore, represented with the same reference numerals to omit duplicate explanation.

The two-speed transmission of the embodiment 3 inputs power of a motor 005 being a driving source to a first sun gear 107 being a sun gear through a first sun gear shaft 105. It is configured that the power after gear shifting is transmitted to a differential 001 being another member through a first drive pinion 102 being a drive pinion for output. The other member is not particularly limited thereto, and may be one other than the differential 001.

The two-speed transmission is provided with an internal gear 101 rotatably relatively to a case 02c. Between the internal gear 101 and a first planet carrier 113, it is configured to adjust frictional torque for connection using a friction clutch mechanism. As the friction clutch mechanism, a first friction clutch mechanism 1004 or a second friction clutch mechanism 2004 explained later is used.

The two-speed transmission of the embodiment 3 is generally provided with the first planet carrier 113 being a planet carrier, the first friction clutch mechanism 1004 or the second friction clutch mechanism 2004 being the friction clutch mechanism, a clutch actuator 159 and the like, in addition to a first meshing clutch mechanism 1002, the first sun gear 107 being a sun gear, and the internal gear 101.

The first sun gear 107 is configured to receive rotation input as mentioned above.

The internal gear 101 meshes with the first sun gear 107 through a first planet pinion 111 being a planet pinion, and corresponds to the first rotor 101 of the first embodiment.

The first planet carrier 113 is supported rotatably relatively to the internal gear 101, and rotatably supports the first planet pinion 111. One side portion of the first planet carrier 113 is rotatably supported to a first boss portion 142 through a bearing 142a.

Another side portion of the first planet carrier 113 is provided with a gear-set support 113a and a hollow output shaft 1112. The output shaft 1112 is fitted to and is relatively rotatably supported with a first sun gear shaft 105. The output shaft 1112 is provided integrally with the first drive pinion 102 being a drive pinion for output.

The first friction clutch mechanism 1004 or the second friction clutch mechanism 2004 is interposed between the internal gear 101 and the first planet carrier 113 and is configured to be fastened to adjust the connection between the internal gear 101 and the first planet carrier 113.

The clutch actuator 159 is configured to adjust the frictional torque of the connection of the friction clutch mechanism according to fastening control of the first friction clutch mechanism 1004 or the second friction clutch mechanism 2004. In the following explanation, explanation is given using the first friction clutch mechanism 1004 and the second friction clutch mechanism 2004 will be explained in the embodiment 4.

Input to the two-step transmission of the embodiment 3 illustrated in FIG. 9 is performed to the first sun gear shaft 105. The first sun gear shaft 105 is connected with a fastening member 103 such as spline or key to a motor shaft 007 of the motor 005 on one end side. The one end side of the first sun gear shaft 105 is supported by a bearing 114 to a shaft-support housing on the case 02c. An interspace between the one end side of the first sun gear shaft 105 and the case 02c is sealed with a packing 116. The first sun gear 107 is connected to a fastening means 109 such as spline or key or is integrally formed on the other end side of the first sun gear shaft 105.

The internal gear 101 has an annulus gear 156 meshing with the first planet pinion 111. The first planet pinion 111 is arranged between the internal gear 101 and the first sun gear 107 and meshes with the both gears. Torque transmitted to the first sun gear 107 is, therefore, transmitted to the internal gear 101 through the first planet pinion 111. One side portion of the internal gear 101 is provided with the first boss portion 142. The other side portion of the internal gear 101 is provided with a first clutch housing 155 for the first friction clutch mechanism 1004.

The torque transmitted to the internal gear 101 is amplified greater than the input torque into the first sun gear 107 according to the connection of the first meshing clutch mechanism 1002. The amplified torque is transmitted to the first planet carrier 113 to drive the first drive pinion 102. At this time, the rotation of the first drive pinion 102 is reduced relatively to of the first sun gear 107 that is input rotation and the two-speed transmission is in the low-speed stage.

When releasing the first meshing clutch 1002 and connecting the first friction clutch mechanism 1004, the torque transmitted to the internal gear 101 is transmitted to the first planet carrier 113 through the first friction clutch mechanism 1004. With this transmission, the first drive pinion 102 is driven.

At this time, the rotations of the first sun gear 107 and the first drive pinion 102 are the same as each other and the two-speed transmission is in the high-speed stage.

Members bearing the transmission function of the two-speed transmission of the embodiment 3 are mainly realized by the first meshing clutch mechanism 1002 and the first friction clutch mechanism 1004.

As illustrated in FIG. 9, the first friction clutch mechanism 1004 is composed of the first clutch housing 155, a first friction clutch hub 140 provided on the first planet carrier 113, first and second friction members 153 and 154, and a pressing force adjustment means.

The first friction members 153 are configured to contact with the second friction member(s) 154 on both sides or one side. The first friction members 153 engage with the first friction clutch hub 140 in a rotational direction at inner diametral portions. The second friction members 154 engage with the first clutch housing 155 in the rotational direction at outer diametral portions. The first clutch housing 155 has a means to receive pressing force applied to the first and the second friction members 153 and 154.

The pressing force adjustment means is provided with a series of a first differential gear set 0171 including a pressing member 175, a first and a second differential gears 171 and 169, and a torque cam 162.

The pressing member 175 has an outer diametral portion contacting with the first friction members 153 or the second friction members 154 to apply pressing force to the first and the second friction members 153 and 154. An inner diametral portion of the pressing member 175 is arranged rotatably relatively to a gear-set support 113a provided to the first planet carrier 113. On the gear-set support 113a, a bearing 173, the first and the second differential gears 171 and 169, and a bearing 167 is arranged in the axial direction. Respective opposing faces of the first and the second differential gears 171 and 169 have a plurality of grooves having a depth tilted in a circumferential direction. A rolling body 161 engages with each groove to form the torque cam 162. The torque cam 162 has a function to convert relatively rotational torque of the first and the second differential gears 171 and 169 into axial thrust.

A first fixing member 165 is fastened and fixed to the gear-set support 113a using a fastening member 168. The first fixing member 165 supports the bearing 167 that receives thrust reaction force generated by the torque cam 162 of the second differential gear 169.

The first differential gear set 0171 is configured to be driven by a clutch pinion 157 meshing with the first and the second differential gears 171 and 169. The clutch pinion 157 is configured to be rotationally driven by the clutch actuator 159. The clutch pinion 157 is attached to an output shaft of the clutch actuator 159 being an electric motor or the like. The clutch actuator 159 is fastened and fixed on the case 02c.

When the first differential gear set 0171 is driven by the clutch actuator 159 in a given direction, the first and the second differential gears 171 and 169, therefore, relatively rotate while rotating. With this relative rotation, the rolling body 161 moves on the tilted face of the torque cam 162, and thrust is generated the first and the second differential gears 171 and 169 in a direction moving away from each other. This thrust presses the first and the second friction members 153 and 154 via the bearing 173 and the pressing member 175 to generate the frictional torque.

Namely, the first friction clutch mechanism 1004 generates the frictional torque to fasten between the internal gear 101 and the first planet carrier 113. With the frictional torque, the first sun gear 107, the internal gear 101, and the first planet carrier 113 rotate together. When the clutch actuator 159 drives the clutch pinion 157 in a reverse rotational direction, the frictional torque of the first friction clutch mechanism 1004 is disappeared.

In contrast, the first friction clutch mechanism 1004 is released, the internal gear 101 is connected to the case 02c using the first meshing clutch mechanism 1002, and the first sun gear 107 is rotated using the motor 005 in a forward direction.

In this state, the internal gear 101 is stopped and accordingly the first planet pinion 111 revolves together with the first planet carrier 113 at a lower angular velocity than of the first sun gear 107 while rotating. The first planet carrier 113 and the first drive pinion 102, therefore, rotate at a low-speed and with higher torque than the first sun gear 107, and the two-speed transmission of the present embodiment is in a state of the low-speed stage.

In the low-speed stage, the coasting torque in the reverse direction relative to the torque of the first sun gear 107 is applied from the first planet pinion 111 to the first meshing clutch 117 of the internal gear 101. In the case of the embodiment 3, a tooth face 123 (see FIG. 2 and FIG. 3) of the first meshing clutch 117 is, therefore, set so as to be a tooth face that receives torque in a reverse rotational direction relative to a forward rotational torque of the first sun gear 107. Namely, the tooth faces 123 and 125 are set as drive tooth faces that receive driving torque relative to the torque in the reverse rotational direction, and tooth faces 120 and 122 are set as coast tooth faces that receive coasting torque.

When the torque in the reverse direction relative to the forward rotational torque to the first sun gear 107 is applied, the torque is applied to the coast tooth faces 120 and 122 of the first and the second meshing clutches 117 and 119. With this torque application, thrust is generated between the first and the second meshing clutches 117 and 119 in a direction separating away from each other.

At this time, similar to the embodiment 1 of FIG. 1 to FIG. 5, when the cam ring 148 is in a rotational phase in which first cam convexities 126 contact with second cam convex flats 128, the sleeve 121 receiving the axial thrust is blocked to move by the cam ring 148. The two-way clutch function of the first meshing clutch mechanism 1002, therefore, works similarly to the embodiment 1. Accordingly, even when the coasting torque is applied to the first sun gear 107, the meshing of the first and the second meshing clutches 117 and 119 is kept.

Gear shifting from the low-speed stage to the high-speed stage makes the first meshing clutch mechanism 1002 be in the state of the one-way clutch function. Namely, the cam ring 148 is rotationally driven using a cam actuator 147 similarly to the embodiment 1. With this rotationally driving, the phases of the first cam convexities 126 of the first sleeve 121 and the second cam concave flats 130 of the cam ring 148 match each other as illustrated in FIG. 4 of the embodiment 1. With this matching, the sleeve 121 is allowed to move in the axial direction until the first cam convexities 126 and the second cam concave flats 130 mesh with each other. This exhibits the one-way clutch function of the first meshing clutch mechanism 1002.

At the same time, the first differential gear set 0171 is driven by the clutch actuator 159 in a given direction, to fasten the first friction clutch mechanism 1004. With this fastening, frictional connection is performed between the internal gear 101 and the first planet carrier 113 by the first friction clutch mechanism 1004. With this frictional engagement, the first meshing clutch 117 starts rotating in the same direction as the first sun gear 107. With this rotation, the coasting torque is applied to the coast tooth faces 120 and 122 of the first and the second meshing clutches 117 and 119. At this time, the second meshing clutch 119 moves backward in the axial direction according to the one-way clutch function of the first meshing clutch mechanism 1002, so that the connection between the first and the second meshing clutches 117 and 119 is automatically released. As this result, the two-speed transmission is smoothly shifted to the high-speed stage without interruption of driving force.

Shifting-down from the high-speed stage to the low-speed stage is performed by releasing the first friction clutch mechanism 1004. The rotation of the motor 005 is increased along with this releasing until the rotation of the internal gear 101 is mostly stopped or slightly reversed. In this stage, the cam ring 148 is rotationally driven by the cam actuator 147. With this rotationally driving, the first cam convexities 126 disengage from the second cam concave flats 130. At the same time, the first cam convexities 126 contact with the second cam convex flats 128. This shifts the two-speed transmission down to the low-speed stage.

In a vehicle or the like having the two-speed transmission of the present invention, in a case that shifting-down needs to be performed while keeping the driving force of the first drive pinion 102 at the time of climbing, seamless shift-down is enabled while keeping the driving force as follows.

Namely, the driving of the clutch actuator 159 is stopped at a point of time when the frictional torque of the first friction clutch mechanism 1004 is reduced until the first and the second friction members 153 and 154 start minutely slipping, to fix the frictional torque of the first friction clutch mechanism 1004. Instead of the fixing of the frictional torque, the first friction clutch mechanism 1004 is fastened and driven in a direction to increase frictional force to the extent not to hinder increase of rotation of the motor 005 explained later. The rotation of the motor 005 is increased until the rotation of the internal gear 101 is stopped or is slightly reversed. The first meshing clutch mechanism 1002 is fastened, and the first friction clutch mechanism 1004 is released simultaneously with the fastening of the first meshing clutch mechanism 1002 or after the fastening as soon as possible.

Normal control of the first friction clutch mechanism 1004 is as follows. The first friction clutch mechanism 1004 is rotationally driven by the clutch actuator 159 in a direction to be fastened from a releasing position. With this rotationally driving, it is deemed to start pressing of the first and the second friction clutches 153 and 155 is started at a point of time when load is caused on the clutch actuator 159. The first friction clutch mechanism 1004 is deemed to be fastened with ΔX rotations from the point of time of the pressing start. The ΔX rotations are determined through tests in advance.

The releasing of the first friction clutch mechanism 1004 is performed by reversely rotating the clutch actuator 159 by ΔX+α.

The connection of the first meshing clutch mechanism 1004 for performing the shift-down needs to be performed when the rotation of the first meshing clutch 117 is stopped or minutely reversed. For this, a sensor 302 detects the rotation of the internal gear 101 and sends it to a controller 301. The controller 301 receiving the sending determines rotational condition of the first meshing clutch 117. With this determination, the cam actuator 147 is driven in a direction to fasten the first meshing clutch mechanism 1002. If the seamless shift-down is performed, it is required to detect a minute slip between the first and the second friction clutches 153 and 154.

Effect of the embodiment 3 is as follows. The shift-up to the high-speed stage is allowed to be the seamless and smooth gear shifting by making the first meshing clutch mechanism 1002 be in the one-way clutch function and fastening the first friction clutch mechanism 1004. Moreover, since the first meshing clutch mechanism 1002 has the two-way clutch function with the locking of the one-way clutch function, the torque transmission is allowed in the reverse direction relative to the normal driving in a regeneration mode of the driving motor 005 at the low-speed stage or at the time of backward driving of the vehicle.

Figure 10:
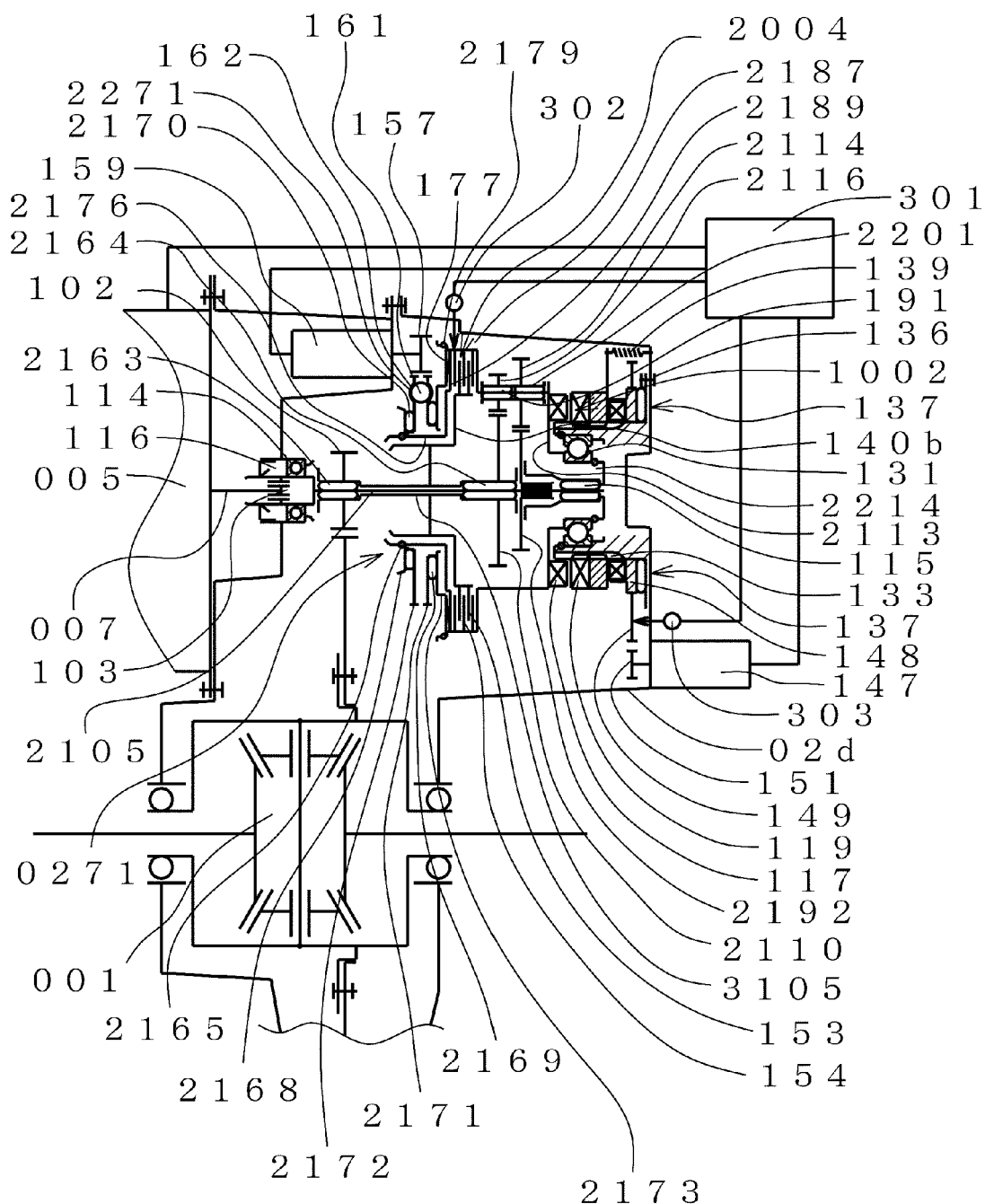
FIG. 10 is a schematic skeleton sectional view of a two-speed transmission with partial omission according to an embodiment 4.
Figure 14:
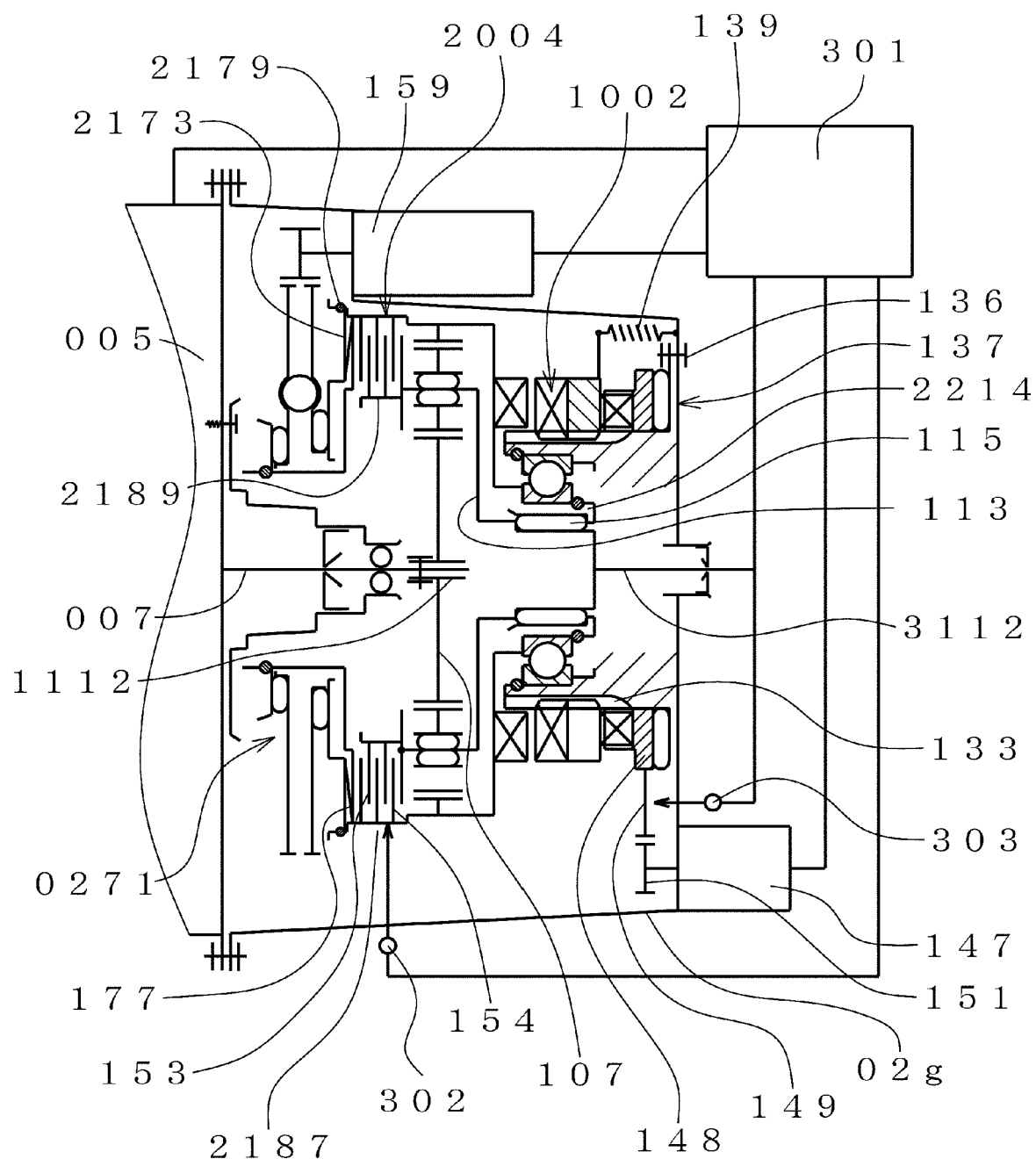
FIG. 14 is a schematic skeleton sectional view of a two-speed transmission with partial omission according to an embodiment 8.

In addition, the embodiment 3 may employ a second or a third friction clutch mechanism 2004 or 3004 explained in the embodiment 4 and embodiment 8 illustrated in FIG. 10 and FIG. 14 instead of the first friction clutch mechanism 1004 of FIG. 9.

FIG. 10 is a schematic skeleton sectional view of a two-speed transmission with partial omission according to the embodiment 4.

As illustrated in FIG. 10, the embodiment 4 configures a two-speed transmission using the first meshing clutch mechanism 1002 of the embodiment 1. The two-speed transmission of the embodiment 4 is similar to the two-speed transmission of the embodiment 3. Components being identical or corresponding to those of the embodiments 1 and 3 are, therefore, represented with the same reference numerals to omit duplicate explanation.

Major differences between the two-speed transmission of the embodiment 4 and the two-speed transmission of the embodiment 3 are as follows. The embodiment 4 does not use the internal gear 101 of the embodiment 3. It is configured that a first meshing clutch mechanism 1002 connects and releases between a second planet carrier 2113 and a case 02*d*. A second friction clutch mechanism 2004 is configured to connect and release between the second planet carrier 2113 and a third sun gear shaft 3105.

The two-speed transmission of the embodiment 4 is generally provided with a second sun gear 2192 as a sun gear, a third sun gear shaft 3105, a second planet pinion 2201 as a planet pinion, the second planet carrier 2113 as a planet carrier, a second friction clutch mechanism 2004 as a friction clutch mechanism, and a clutch actuator 159 in addition to the first meshing clutch mechanism 1002.

The second sun gear 2192 is configured to receive rotation input from a motor 005 using the third sun gear shaft 3105 as a sun gear shaft.

The third sun gear shaft 3105 is fitted and is rotatably supported to a second sun gear shaft 2105 as a sun gear shaft. The third sun gear shaft 3105 is provided with a third sun gear 2110 and a drive pinion 2164 for output. In addition, the second sun gear shaft 2105 corresponds to the first sun gear shaft 105 of the embodiment 3.

The second planet pinion 2201 is provided integrally with a first and a second gears 2114 and 1226. The first gear 2114 meshes with the second sun gear 2192. The second gear 2116 meshes with the third sun gear 3105. The second gear 2116 is set to have the less number of teeth than of the first gear 2114.

The second planet carrier 2113 rotatably supports the second planet pinion 2201. In addition, the second planet carrier 2113 corresponds to the first rotor 101 of the embodiment 1.

The second friction clutch mechanism 2004 is interposed between the second planet carrier 2113 and the third sun gear shaft 3105 and is configured to be fastened to adjust connection between the second planet carrier 2113 and the third sun gear shaft 3105.

The clutch actuator 159 is configured to adjust frictional torque of the connection according to fastening control of the second friction clutch mechanism 2004.

Input to the two-speed transmission of the embodiment 4 illustrated in FIG. 10 is performed to the second sun gear shaft 2105. The second sun gear shaft 2105 is connected to a motor shaft 007 of the motor 005 on one end side similarly to the embodiment 3. The other end side of the second sun gear shaft 2105 is rotatably supported to a second boss 2214 of the second planet carrier 2113 through a bearing 115.

The third sun gear shaft 3105 is provided integrally with a second friction clutch hub 140*b*. The second friction clutch hub 140*b* is configured to engage with inner diametral portions of first friction members 153 in a rotational direction. The third sun gear shaft 3105 is provided integrally with a first drive pinion 102 as a drive pinion for output. The first drive pinion 102 is configured to drive other members such as a differential 001. The third sun gear shaft 3105 is supported on an outer periphery of the second sun gear shaft 2105 through bearings 2163 and 2164.

The second planet pinion 2201 is rotatably supported to the second planet carrier 2113 through a bearing 191. The second planet carrier 2113 is provided with a second clutch housing 2187 on one side portion. The second clutch housing 2187 is configured to engage with outer diametral portions of second friction members 154 in the rotational direction. The second clutch housing 2187 has a means to receive pressing force applied to the first and the second friction members 153 and 154. The other side portion of the second planet carrier 2113 is provided integrally with the second boss 2214. The second boss 2214 is rotatably supported to an inner diametral portion of a first clutch hub 133 of a clutch holder 137 of a clutch holder 137 through a bearing 131.

Here, differences between the second friction clutch mechanism 2004 and the first friction clutch mechanism 1004 will be explained.

The first friction clutch mechanism 1004 explained with FIG. 9 is configured that the pressing force adjustment means is provided with the series of the first differential gear set 0171 including the pressing member 175, the first and the second differential gears 171 and 169, and the torque cam 162 as mentioned above. The torque cam 162 generates the thrust according to the driving of the clutch actuator 159, to press the first and the second friction members 153 and 154 by the pressing member 175.

In contrast, in the second friction clutch mechanism 2004, a pressing force adjustment means is provided with an elastic body 177. The elastic body 177 is configured to apply the pressing force to the first and the second friction members 153 and 154. It is configured that axial thrust generated at a torque cam 2271 cancels out the pressing force of the elastic body 177, to reduce or disappear the frictional torque of the second friction clutch mechanism 2004.

The second friction clutch mechanism 2004 supports and engages an outer periphery of the second friction member 154 with the second clutch housing 2187 in the rotational direction. The second clutch housing 2187 has a means to receive pressing force of the first and the second friction members 153 and 154. The second friction members 154 at the outer peripheral portions engages with the second clutch housing 2187 in the rotational direction. The first friction members 153 contact with the second friction members 154 on one side or both sides, and engages with the second friction clutch hub 140*b* in the rotational direction at the inner diametral portions.

The pressing force adjustment means applies or adjusts the pressing force to the first and the second friction member 153 and 154. The pressing force adjustment means is provided with a first pressing force adjustment member 2189 as a pressing force adjustment member. The first pressing force adjustment member 2189 is configured to contact with any one of the first and the second friction members 153 and 154 and adjust the pressing force between the friction members. The pressing force adjustment member 2189 is provided integrally with a gear-set support 2176 being a hollow shaft. A second differential gear set 0271 is arranged on the gear-set support 2176. The second differential gear set 0271 corresponds to the first differential gear set 0171 of the embodiment 3.

The second differential gear set 0271 is provided with the elastic body 177. The elastic body 177 contacts with the first pressing force adjustment member 2189. It is configured that the elastic body 177 presses the first pressing force adjustment member 2189 and the pressing force is generated on the first and the second friction members 153 and 154 for the fastening. It is configured that reaction force of the elastic body 177 is received by a reaction force member 2173. The reaction force member 2173 is fixed to the second clutch housing 2187 using a fastening member 2179.

An inner diametral portion of the reaction force member 2173 contacts a bearing 2169 and is arrayed with a third and a fourth differential gears 2171 and 2172, and a bearing 2170 in an axial direction. A torque cam 2271 is configured between the third and the fourth differential gears 2171 and 2172 similar to the embodiment 3. The bearing 2170 is configured that axial force is received by a second fixing member 2168. The second fixing member 2168 is fixed to the gear-set support 2176 with a fastening member 2165.

The second differential gear set 0271 is driven by the clutch actuator 159 through a clutch pinion 157. When the second differential gear set 0271 is driven in a direction generating thrust of the torque cam 2271, the generated axial thrust is transmitted to the gear-set support 2176 of the first pressing force adjustment member 2189. With this transmission, the gear-set support 2176 moves so as to separate the bearings 2170 and 2169 away from each other. The first pressing force adjustment member 2189 moves together with that movement. With the movement of the first pressing force adjustment member 2189, the pressing force of the elastic body 177 is reduced. With this reduction, the friction torque of the second friction clutch mechanism 2004 is reduced or disappeared.

Operation of the two-speed transmission of the embodiment 4 is the same as of the two-speed transmission of the embodiment 3 basically. The low-speed stage fixes the rotation of the second planet carrier 2113 on the case 02*d* side according to the first meshing clutch mechanism 1002 mentioned above. In this state, the second planet pinion 2201 only rotates without revolving. Accordingly, the rotation of the second sun gear 2192 is transmitted to the third sun gear 2110 having the relatively larger number of the teeth. Rotating speed of the third sun gear 2110 is, therefore, lower than rotating speed of the second sun gear 2192 performing input rotation, and the first drive pinion 102 is driven at that speed. The driving state is the low-speed stage. At the low-speed stage, the second planet carrier 2113 receives the torque in the reverse direction relative to the second sun gear 2192. The meshing of the first and the second meshing clutches 117 and 119, therefore, becomes similarly to that of the embodiment 3 as explained in the embodiment 3.

Shifting from the low-speed stage to the high-speed stage rotates the cam ring 148 using the cam actuator 147 similarly to the embodiment 3. This rotation makes the first meshing clutch mechanism 1002 fixing the rotation of the second planet carrier 2113 be in the one-way clutch function. The clutch actuator 159 drives the first and the second differential gear sets 0171 and 0271 through the clutch pinion 157. With this driving, the second friction clutch mechanism 2004 connects the rotations between the second planet carrier 2113 and the third sun gear shaft 3105. With this connection, relative rotation among the second planet pinion 2201, the second sun gear 2192 having input rotating speed and the third sun gear 2110 is fixed. With this fixing, the rotation of the second sun gear 2192 is not reduced to be transmitted to the third sun gear shaft 3105 and it becomes the high-speed stage.

Shifting down from the high-speed stage to the low-speed stage is the same as of the embodiment 3. Connection between the third sun gear shaft 3105 and the second planet carrier 2113 is released by operation of the second friction clutch mechanism 2004. Alternatively, coupling force or torque of the second friction clutch mechanism 2004 is reduced until the first and the second friction members 153 and 154 start minutely slipping. At that point of time, the rotation of the motor 005 is increased until the rotation of the second planet carrier 2113 is stopped or is slightly reversed. In this stage, the cam ring 148 is rotated to work first cam convexities 126 and second cam convex flats 128. With this working, the first and the second meshing clutches 117 and 119 of the first meshing clutch mechanism 1002 keep meshing.

In addition, the second friction clutch mechanism 2004 of the embodiment 4 may be configured by the first friction clutch mechanism 1004 of the embodiment 3 as mentioned above. In this case, the second clutch housing 2187 is replaced with the first clutch housing 155 of the embodiment 3 illustrated in FIG. 9. The pressing member 175 of the embodiment 3 is assembled into the replaced first clutch housing 155. The pressing member 175 is a component instead of the first pressing force adjustment member 2189, the elastic body 177, and the reaction force member 2173. The first friction clutch mechanism 1004 with this arrangement may connect and release between the second planet carrier 2113 and the third sun gear shaft 3105.

Differences of the embodiment 4 with respect to the embodiment 3 in effect are as follows. In the case that the internal gear 101 and the first planet pinion 111 being a single planet pinion are used as the embodiment 3, a reduction ratio of the low-speed stage is greater than 2 and is hard to be made close to 2.

In contrast, the embodiment 4 freely selects the reduction ratio including 2. Further, it is low-cost with no internal gear.

Figure 11:
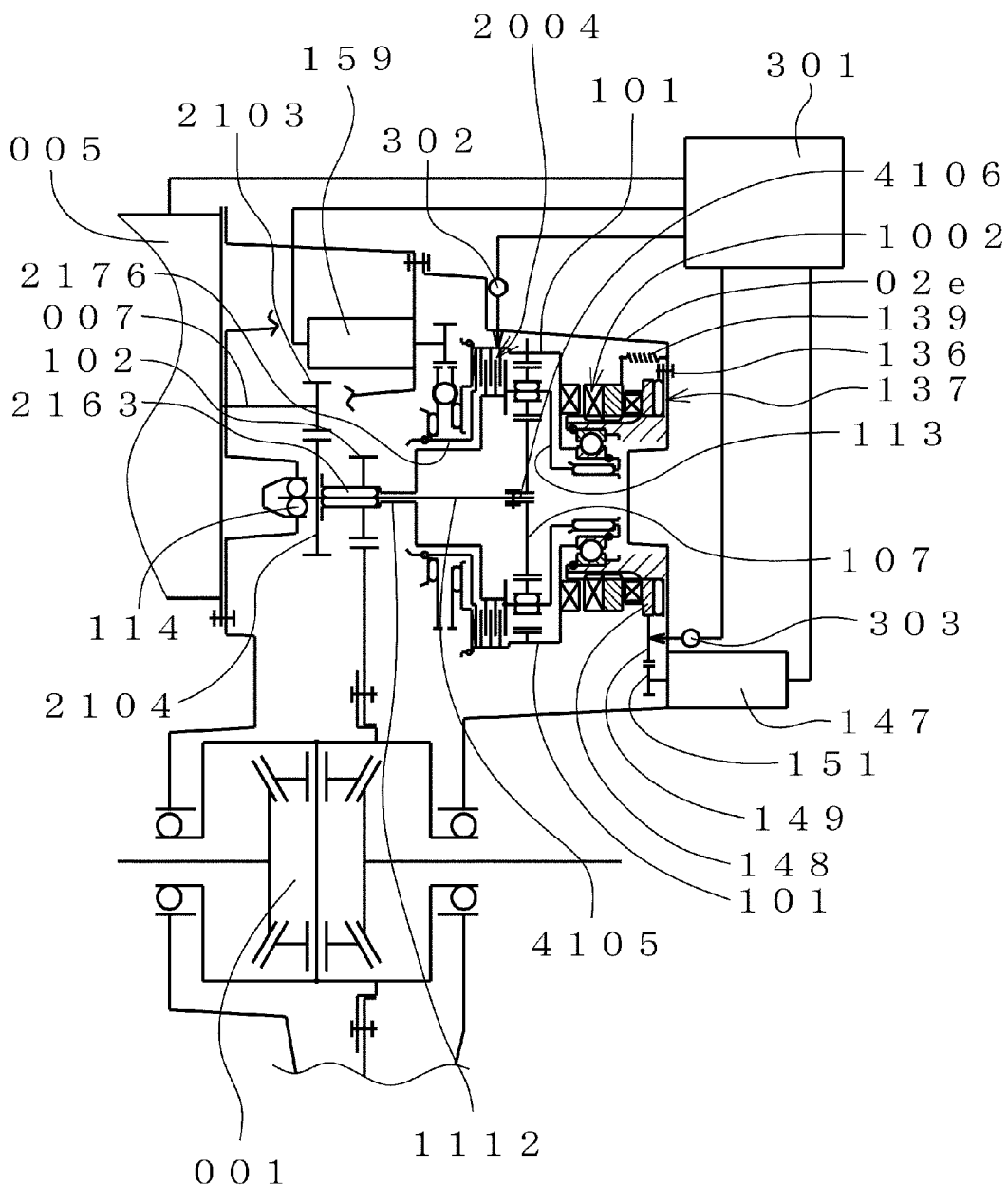
FIG. 11 is a schematic skeleton sectional view of a two-speed transmission with partial omission according to an embodiment 5.

FIG. 11 is a schematic skeleton sectional view of a two-speed transmission with partial omission according to the embodiment 5.

As illustrated in FIG. 11, the embodiment 5 configures a two-speed transmission using the first meshing clutch mechanism 1002 of the embodiment 1. In the two-speed transmission of the embodiment 5, the means to receive the power of the motor 005 of the embodiment 3 is changed, and the second friction clutch mechanism 2004 of the embodiment 4 is employed as a friction clutch mechanism. Main parts of components being identical or corresponding to those of the embodiments 1, 3, and 4 are, therefore, represented with the same reference numerals or the same reference numerals in the 4000s to omit duplicate explanation.

The two-speed transmission of the embodiment 5 is different from the two-speed transmission of the embodiment 3 in the following respects. The two-speed transmission of the embodiment 5 performs rotation input from a motor 005 to a first sun gear 107 as a sun gear by a drive gear 2103 of a motor shaft 007 and a driven gear 2104 of a fourth sun gear shaft 4105.

As illustrated in FIG. 11, the drive gear 2103 is fixed to the motor shaft 007. The drive gear 2103 meshes with the driven gear 2104 fixed to the fourth sun gear shaft 4105 as a sun gear shaft. The fourth sun gear shaft 4105 is rotatably supported by a bearing 114 on a case 02*e*. The first sun gear 107 engages with the fourth sun gear shaft 4105 by a fastening means 4106 such as splines or is formed integrally with the fourth sun gear shaft.

An interspace between an internal gear 101 and a first planet carrier 113 is configured to be connected and released by the second friction clutch mechanism 2004 of the embodiment 4 similar to the embodiment 3. The second friction clutch mechanism 2004 may be replaced with the first friction clutch mechanism 1004 of the embodiment 3.

At the time of gear shifting, the first meshing clutch mechanism 1002 connects or releases between the internal gear 101 and the case 02*e*. The structure, function, and control of the gear shifting are the same as of the embodiments 3 and 4 mentioned above.

Characteristics of the embodiment 5 relative to the embodiments 3 and 4 are as follows. A gear train comprising the drive gear 2103 and the driven gear 2104 is interposed into a path to input the driving force contrary to the embodiments 3 and 4. With this, a reduction or an acceleration gear ratio of the gear train is changed, thereby freely changing input rotation to the first sun gear 107. Accordingly, choices of the reduction gear ratio of the two-speed transmission of the embodiment 5 are increased. Further, a center distance between the motor shaft 007 and the differential 001 or the like is expanded to increase a degree of freedom in layout.

Figure 12:
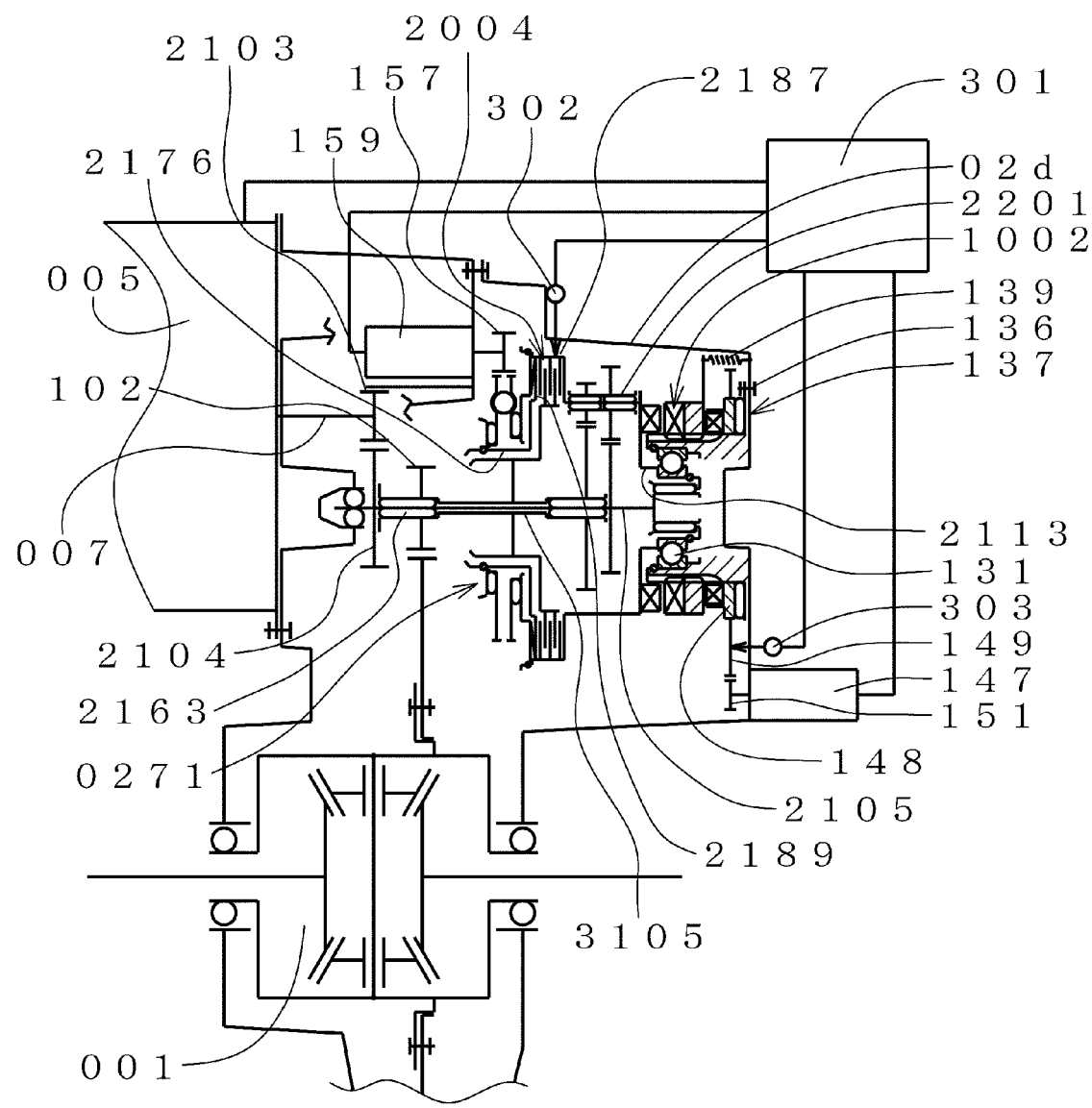
FIG. 12 is a schematic skeleton sectional view of a two-speed transmission with partial omission according to an embodiment 6.

FIG. 12 is a schematic skeleton sectional view of a two-speed transmission with partial omission according to the embodiment 6.

As illustrated in FIG. 12, a two-speed transmission of the embodiment 6 employs the input structure of the embodiment 5 for the structure of the embodiment 4. Main parts of components being identical or corresponding to those of the embodiments 4 and 5 are, therefore, represented with the same reference numerals to omit duplicate explanation.

Namely, in the embodiment 4 the rotation input structure from the motor 005 to the second sun gear shaft 2105 is the coaxial linear structure whereas in the embodiment 6 it is configured similarly to the embodiment 5. A driven gear 2104 of the second sun gear shaft 2105 meshes with a drive gear 2103 of a motor shaft 007 of the motor 005. With this, the embodiment 6 provides the same effects as the embodiment 5 relative to the structure of the embodiment 4.

Figure 13:
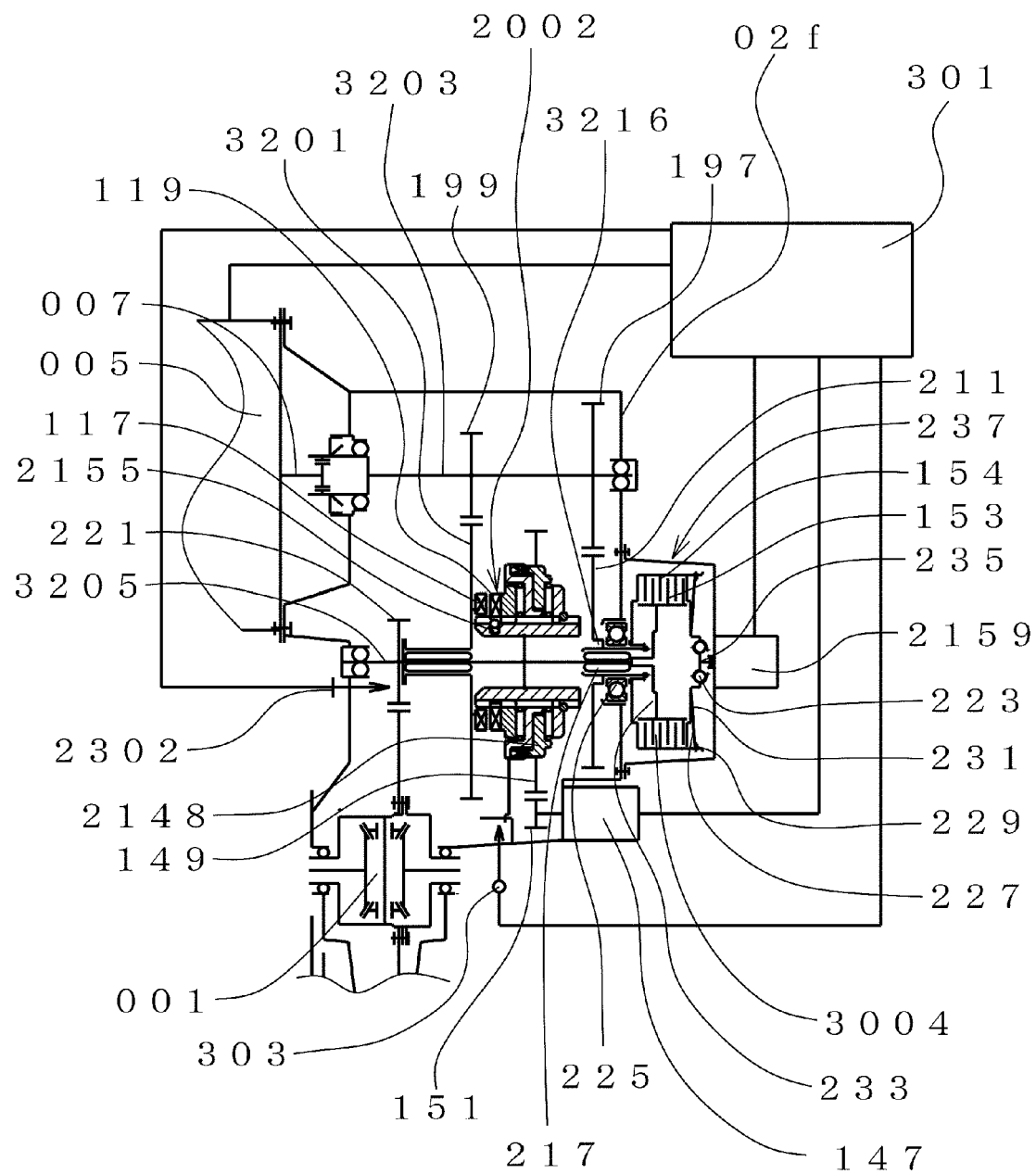
FIG. 13 is a schematic skeleton sectional view of a two-speed transmission with partial omission according to an embodiment 7.

FIG. 13 is a schematic skeleton sectional view of a two-speed transmission with partial omission according to the embodiment 7.

As illustrated in FIG. 13, the embodiment 7 configures a two-speed transmission using the second meshing clutch mechanism 2002 of the embodiment 2. Components being identical or corresponding to those of the embodiment 2 are, therefore, represented with the same reference numerals to omit duplicate explanation.

The two-speed transmission of the embodiment 7 is generally provided with an input shaft 3203 and an output shaft 3205, a low-speed and a high-speed drive gears 199 and 197, a low-speed and a high-speed driven gears 3201 and 211, a third friction clutch mechanism 3004 as a friction clutch mechanism, and a clutch actuator 2159 in addition to the second meshing clutch mechanism 2002.

The input shaft 3203 is provided integrally with the low-speed drive gear 199 and the high-speed drive gear 197 and is configured to receive rotational input from a motor 005.

The output shaft 3205 is configured to have the low-speed driven gear 3201 meshing with the low-speed drive gear 199, the high-speed driven gear 211 meshing with the high-speed drive gear 197, and a second drive pinion 221 as a drive pinion for output.

The output shaft 3205 forms the torque transmission shaft 2102 of the embodiment 2. The input shaft 3203 may, however, form a torque transmission shaft corresponding to the torque transmission shaft 2102. The torque transmission shaft in this case means that it rotatably supports a rotor having the first meshing clutch 117 so as to be fitted thereto and is provided with a second clutch hub 2133 and does not intend output.

In the embodiment 7, since the output shaft 3205 forms the torque transmission shaft 2102 of the embodiment 2, the low-speed driven gear 3201 forms the second rotor 2101 of the embodiment 2 and the low-speed drive gear 199 is fixed to the input shaft 3203.

In a case that the input shaft 3203 forms the torque transmission shaft 2102 of the embodiment 2, it is, however, configured that the low-speed drive gear 199 forms the second rotor 2101 of the embodiment 2 and the low-speed driven gear 3201 is fixed to the output shaft.

The high-speed driven gear 211 is rotatably provided on the output shaft 3205. The third friction clutch mechanism 3004 is provided between the output shaft 3205 and the high-speed driven gear 211. The third friction clutch mechanism 3004 is configured to adjust connection between the output shaft 3205 and the high-speed driven gear 211.

It may be, however, configured that the high-speed drive gear 197 is rotatably supported on the input shaft 3203, and the third friction clutch mechanism 3004 is provided between the high-speed drive gear 197 and the input shaft 3203. In this case, the third friction clutch mechanism 3004 is configured to adjust connection between the input shaft 3203 and the high-speed drive gear 197.

The clutch actuator 2159 is driven to control fastening the third friction clutch mechanism 3004. It is configured that the frictional torque of the connection is adjusted with this fastening control.

A pressing force adjustment means is provided for conducting fastening between the clutch actuator 2159 and the third friction clutch mechanism 3004.

The pressing force adjustment means is provided with an elastic body 227 and a second pressing force adjustment member 231. The elastic body 227 is configured by, for example, a disk spring. The elastic body 227 is configured to generate pressing force to fasten the third friction clutch mechanism 3004. The second pressing force adjustment member 231 receives the pressing force of the elastic body 227 to conduct the fastening. The second pressing force adjustment member 231 is a component connected to the clutch actuator 2159 side.

The clutch actuator 2159 is configured to drive the second pressing force adjustment member 231 to adjust the pressing force of the elastic body 227. The clutch actuator 2159 is a component being, for example, a hydraulic cylinder, an air cylinder, a solenoid or the like. The clutch actuator 2159 is configured that an output shaft such as piston rod is driven in an axial direction. An electric motor may be, however, used to rotate a ball screw and linearly move a ball nut.

Input to the two-speed transmission of the embodiment 7 illustrated in FIG. 13 is performed to the input shaft 3203. The input shaft 3203 is rotatably supported on the case 02f. The input shaft 3203 is coaxially arranged on and is integrally connected to a motor shaft 007 of the motor 005. The input shaft 3203 is provided integrally with the low-speed drive gear 199 and the high-speed drive gear 197 as mentioned above.

The output shaft 3205 is arranged in parallel with respect to the input shaft 3203. The output shaft 3205 is provided integrally with the second drive pinion 221. The second drive pinion 221 is a component to transit power after gear shifting to another member such as differential 001.

The low-speed driven gear 3201 and the high-speed driven gear 211 are rotatably supported on the output shaft 3205.

The low-speed driven gear 3201 is rotatably supported on the input shaft 3203. The low-speed driven gear 3201 meshes with the low-speed drive gear 199 of the input shaft 3203 to form a low-speed gear train. The low-speed driven gear 3201 has the first meshing clutch 117 of the second meshing clutch mechanism 2002.

The high-speed driven gear 211 meshes with the high-speed drive gear 197 of the input shaft 3203 to form a high-speed gear train. Two gear trains are configured by the low-speed gear train and the high-speed gear train.

The high-speed driven gear 211 is fitted and arranged rotatably on the output shaft 3205. The high-speed driven gear 211 has a third boss 3216. The third boss 3216 is rotatably supported on the case 02f through a bearing 225 and is positioned and fixed in the axial direction.

The two-speed transmission of the present embodiment 7 illustrated in FIG. 13 performs torque transmission through the second meshing clutch mechanism 2002 of the embodiment 2 at the low-speed stage, and through the third friction clutch mechanism 3004 at the high-speed stage, and performs gear shifting with cooperation of both the mechanisms similarly to the other embodiments.

The second meshing clutch mechanism 2002 is configured to connect and release between the low-speed driven gear 3201 and the output shaft 3205.

The third friction clutch mechanism 3004 is configured to connect and release between the high-speed driven gear 211 and the output shaft 3205.

In addition, the first or the second friction clutch mechanisms 1004 or 2004 may be used instead of the third friction clutch mechanism 3004.

As illustrated in FIG. 13, the third friction clutch mechanism 3004 is provided with a third clutch housing 237, a third clutch hub 233, first and second friction members 153 and 154, and a pressing force adjustment means.

The third clutch housing 237 is connected integrally with the third boss 3216 of the higher-driven gear 211. The third clutch housing 237 is rotatably supported and axially positioned on the third boss 3216 with interposition of the bearing 225. The third clutch housing 237 has a means to receive pressing force to the first and the second friction members 153 and 154.

The third clutch hub 233 is provided on its inner peripheral portion with a shaft portion passing through an inner diametral portion of the third boss 3216, and the shaft portion is rotatably supported on the third boss 3216 with a bearing 217. The shaft portion of the third clutch hub 233 is connected integrally with the output shaft 3205.

The first friction member 153 engages with an outer peripheral portion of the third clutch hub 233 in a rotational direction. The second friction member 154 engages with an inner peripheral portion of the third clutch housing 237 in the rotational direction. The second friction members 154 are components contacting the first friction members 153 on one side or both sides.

The second pressing force adjustment member 231 is a component contacting the first or the second friction member 153 or 154 to adjust the pressing force applied to the first and the second friction members 153 and 154.

The elastic body 227 is a component to urge the second pressing force adjustment member 231 and apply axial force to press the first and the second friction members 153 and 154. It is configured that reaction force of the elastic body 227 is received by a fastening member 229 fixed on the third clutch housing 237.

An inner diametral portion of the second pressing force adjustment member 231 is rotatably supported by a bearing 223. The bearing 223 is connected to a piston rod of the clutch actuator 2159 through a pressure reduction member 235. The pressure reduction member 235 is a component integrally with an inner race of the bearing 223. The clutch actuator 2159 drives the inner diametral portion of the second pressing force adjustment member 231 through the pressure reduction member 235 and the bearing 223 in the axial direction. It is configured to recoverably apply axial force in a direction reducing the pressing force of the elastic body 227 with that driving.

The two-speed transmission of the embodiment 7 becomes in the low-speed stage by connecting the low-speed driven gear 3201 and the output shaft 3205 according to a two-way clutch function of the second meshing clutch mechanism 2002. A rotational phase of the second cam ring 2148 of the second meshing clutch mechanism 2002 is shifted to put the second meshing clutch mechanism 2002 into a one-way clutch function, and the third friction clutch mechanism 3004 is connected to shift up to the high-speed stage.

Shift-down is performed as mentioned in the other embodiments. Namely, the fastening of the third friction clutch mechanism 3004 is released. The rotation of the motor 005 is steeply increased until the first meshing clutch 117 is synchronized with or slightly exceeds the rotation of the second meshing clutch 119. At that point of time, the cam actuator 147 drives the cam ring 2148, to mesh the first and the second meshing clutches 117 and 119 with each other.

Seamless shift-down is performed as mentioned above. Namely, the frictional torque of the third friction clutch mechanism 3004 is reduced. With this reduction, a minute slip is detected between the first and the second friction members 153 and 154. The minute slip is detected by detecting rotational speed of the second drive pinion 221 using a rotation detecting means 2302 as a sensor and calculating the same by comparison with the number of rotation of the motor 005, for example. At a moment when the minute slip is generated, fastening force of the third friction clutch mechanism 3004 is fixed. In particular, the actuator 2159 is stopped, and the number of rotation of the motor 005 is steeply increased until the first meshing clutch 117 is synchronized with or slightly exceeds the second meshing clutch 119. At that time, the first and the second meshing clutches 117 and 119 mesh with each other, and the third friction clutch mechanism 3004 is released at the same time.

Although the embodiment 7 is an example that the second meshing clutch mechanism 2002 and the third friction clutch mechanism 3004 are arranged on the output shaft 3205, the second meshing clutch mechanism 2002 and the third friction clutch mechanism 3004 may be altered as (2)-(4) compared with the following layout (1).

(1) Layout mentioned above in the embodiment 7, in which the second meshing clutch mechanism 2002 and the third friction clutch mechanism 3004 are provided on the output shaft 3205.
(2) Layout in which the second meshing clutch 2002 is provided on the output shaft 3205 and the third friction clutch mechanism 3004 is provided on the input shaft 3203.
(3) Layout in which the third friction clutch mechanism 3004 is provided on the output shaft 3205 and the second meshing clutch mechanism 2002 on the input shaft 3203.
(4) Layout in which the second meshing clutch mechanism 2002 and the third friction clutch mechanism 3004 are provided on the input shaft 3203.

The four combinations as mentioned above are available.

Further, the third friction clutch mechanism 3004 may be configured by the other clutch such as hydraulic pressure, air pressure, or electromagnetic clutch.

In the embodiment 7, the transmission gear performs the biaxial meshing, so that the gear ratio is freely chosen for both the high-speed stage and the low-speed stage. Further, the basic structure is that one gear train is added to a single gear train of a normal two-axis reduction gear for an electric vehicle to modify the single gear train into the gears in the two lines only. Accordingly, it involves little change against the two-axis reduction gear for an electric vehicle in the basic structure and the appearance form, is simple in structure, is lightweight, and is advantageous for mounting on a vehicle.

FIG. 14 is a schematic skeleton sectional view of a two-speed transmission with partial omission according to the embodiment 8.

As illustrated in FIG. 14, a two-speed transmission of the embodiment 8 is basically configured in the same way as the embodiment 3. Components being identical or corresponding to those of the embodiment 3 are, therefore, explained with the main same reference numerals to omit duplicate explanation.

On the other hand, the embodiment 8 is configured to be provided with a second output shaft 3112 as an output shaft connected to a first planet carrier 113 and arranged so as to be protruded outside.

Namely, a first sun gear 107 is fastened to or integrally formed on a motor shaft 007. One side portion of the first planet carrier 113 is provided with a second output shaft 3112. The second output shaft 3112 passes through an inner diametral portion of a first clutch hub 133 of a first meshing clutch mechanism 1002 and a case 02g, to be arranged so as to be protruded outside. It is configured that an exterior member is allowed to be connected to the second output shaft 3112.

The other side portion of the first planet carrier 113 is separated from a portion being a hollow output shaft 1112 in the embodiment 3, and the output shaft 1112 is configured as a hollow shaft not to directly perform output. The first sun gear 107 is connected to the hollow shaft 1112, and the hollow shaft 1112 is connected and fixed to the motor shaft 007.

The others are the same as of the embodiment 3 in basic structure and function.

Difference of the two-speed transmission of the embodiment 8 used in an electric vehicle with respect to the embodiment 3 is as follows. Namely, the two-speed transmission of the embodiment 3 is suitable for the layout in which the motor 005 is horizontally mounted on the vehicle whereas the layout of the embodiment 8 is suitable for a layout in which the motor 005 is vertically mounted.

Figure 15:
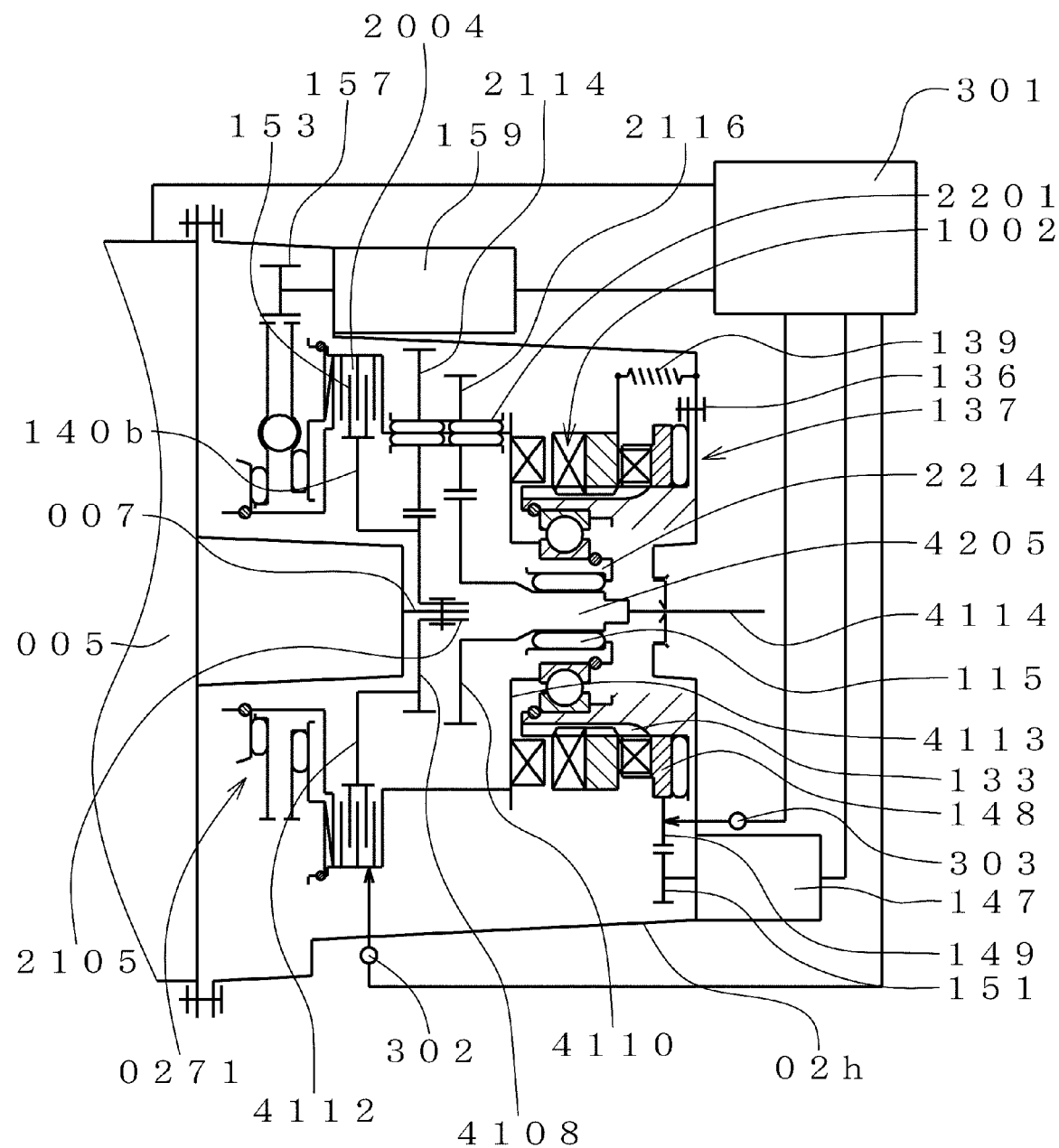
FIG. 15 is a schematic skeleton sectional view of a two-speed transmission with partial omission according to an embodiment 9.

FIG. 15 is a schematic skeleton sectional view of a two-speed transmission with partial omission according to the embodiment 9.

As illustrated in FIG. 15, a two-speed transmission of the embodiment 9 is basically configured in the same way as the embodiment 4. Components being identical or corresponding to those of the embodiment 4 are, therefore, explained with the main same reference numerals to omit duplicate explanation.

On the other hand, the embodiment 9 is provided with a third sun gear output shaft 4205 and an extended output shaft 4114 as an output shaft connected to a third sun gear 4110 and arranged so as to be protruded outside.

In the two-speed transmission of the embodiment 9, positions of a first gear 2114 and a second sun gear 4108 and positions of a second gear 2116 and a third sun gear 4110 are reversed in an axial direction compared with the two-speed transmission of the embodiment 4.

The second sun gear 4108 is fastened or integrally formed on a motor shaft 007. The third sun gear 4110 is provided with the third sun gear output shaft 4205 and the extended output shaft 4114. The extended output shaft 4114 is configured to be formed by extension of the third sun gear output shaft 4205. The third sun gear output shaft 4205 corresponds to the third sun gear shaft 3105 of the embodiment 4. The third sun gear output shaft 4205 is rotatably supported on a second boss 2214 of a second planet carrier 4113 through a bearing 115. The extended output shaft 4114 passes through a case 02h and is arranged so as to be protruded outside. It is configured that an exterior member is allowed to be connected to the extended output shaft 4114.

The second sun gear 4108 is connected to a hollow shaft 2105, and the hollow shaft 2105 is fixed to the motor shaft 007. The hollow shaft 2105 corresponds to the second sun gear shaft 2105 of the embodiment 4. The second sun gear shaft 2105 of the embodiment 4 is used as the hollow shaft 2105 and is directly connected to the motor shaft 007.

The second sun gear 4108 in the embodiment 9 is provided integrally with the second friction clutch hub 140b in the embodiment 4. The second friction clutch mechanism 2004 of the embodiment 9 is configured to control fastening between the second planet pinion 2201 and the second sun gear 4108.

Even in the two-speed transmission of the embodiment 9, the second friction clutch mechanism 2004 may be replaced with the first friction clutch mechanism 1004. The embodiment 9 is effective on an electric vehicle with a vertical mounted motor similarly to the embodiment 8.

Although the torque transmission in the high-speed stage in the two-speed transmissions of the embodiments 3-9 is implemented by the first, the second, or the third friction clutch mechanisms 1004, 2004, and 3004, it may be modified as follows.

(1) Thrust is generated by a worm wheel and a torque cam instead of the first and the second differential gear set 0171 or 0271 to press the first and the second friction members 153 and 154.

(2) Using a hydraulic clutch or an electromagnetic clutch.

The invention claimed is:

1. A meshing clutch mechanism, comprising:
a rotor being provided with a first meshing clutch and being rotatably supported, the first meshing clutch having a tooth face to transmit positive torque and a tooth face to transmit negative torque, the tooth face to transmit negative torque angled to release meshing according to the negative torque;
a sleeve being provided with a second meshing clutch to mesh with the first meshing clutch and a first cam for the meshing, being urged so as to release the meshing, and engaging with a clutch hub in a rotational direction and being supported on the clutch hub movably in an axial direction, the clutch hub being fixed on a case;
a retaining member urging the sleeve to keep a releasing position between the first and the second meshing clutches;
a cam ring being provided with a second cam engaging with the first cam and being configured to convert movement in the rotational direction into movement in the axial direction to be transmitted to the sleeve and lock the meshing according to cooperation of the first and the second cams, the locking releasable by rotationally driving the cam ring; and
a cam actuator that rotationally drives the cam ring.

2. A meshing clutch mechanism, comprising:
a rotor being provided with a first meshing clutch and being rotatably fitted and supported to a torque transmission shaft being provided with a clutch hub, the first meshing clutch having a tooth face to transmit positive torque and a tooth face to transmit negative torque, the tooth face to transmit negative torque angled to release meshing according to the negative torque;
a sleeve being provided with a second meshing clutch to mesh with the first meshing clutch, being urged so as to release the meshing, and engaging with the clutch hub in a rotational direction and being supported by the clutch hub movably in an axial direction;
a retaining member urging the sleeve to keep a releasing position between the first and the second meshing clutches;
a cam member being rotatably fitted to the clutch hub and being supported by the clutch hub movably in the axial direction, being provided with a first cam for the meshing, being arranged adjacent to the sleeve so as to be rotatable relatively to the sleeve and transmit axial force to the sleeve, and un-rotatably engaging with a case;
a cam ring being provided with a second cam engaging with the first cam, being arranged to face the cam member, being supported rotatably relatively to the clutch hub, and being prevented from separating movement relative to the cam member in the axial direction, to convert movement in the rotational direction into movement in the axial direction to be transmitted to the cam member and lock the meshing according to cooperation of the first and the second cams, the locking releasable by rotationally driving the cam ring; and
a cam actuator that rotationally drives the cam ring.

3. Two-step transmission using the meshing clutch mechanism according to claim 1, comprising:
a sun gear that receives rotation input;
an internal gear meshing with the sun gear through a planet pinion and forming the rotor;
a planet carrier being supported rotatably relatively to the internal gear, rotatably supporting the planet pinion, and being provided with a drive pinion for output;
a fiction clutch mechanism interposed between the internal gear and the planet carrier to adjust connection between the internal gear and the planet carrier according to fastening; and a clutch actuator that adjusts frictional torque of the connection according to fastening control of the friction clutch mechanism.

4. A two-step transmission using the meshing clutch mechanism according to claim 1, comprising:
a sun gear that receives rotation input through a sun gear shaft;
a third sun gear shaft being rotatably supported to the sun gear shaft and being provided with a third sun gear and a drive pinion for output;
a planet pinion being integrally provided with a first gear meshing with the sun gear and a second gear meshing with the third sun gear;
a planet carrier rotatably supporting the planet pinion to form the rotor;
a fiction clutch mechanism interposed between the third sun gear shaft and the planet carrier to adjust connection between the third sun gear shaft and the planet carrier according to fastening; and
a clutch actuator that adjusts frictional torque of the connection according to the fastening of the friction clutch mechanism.

5. The two-speed transmission according to claim 3, wherein
the rotation input to the sun gear is performed through a drive gear and a driven gear from a motor.

6. The two-speed transmission according to claim 3, further comprising:
a pressing force adjustment means between the clutch actuator and the friction clutch mechanism to conduct the fastening, wherein
the pressing force adjustment means comprises:
a first differential gear and a second differential gear being supported rotatably relatively to each other and being different from each other in number of teeth;
a torque cam that converts relative rotation between the first differential gear and the second differential gear into axial thrust;
a clutch pinion meshing with the first differential gear and the second differential gear and receiving rotation input from the clutch actuator; and
a pressing member that receives the axial thrust converted by the torque cam to conduct the fastening.

7. The two-speed transmission according to claim 3, further comprising:
a pressing force adjustment means between the clutch actuator and the friction clutch mechanism to conduct the fastening, wherein
the pressing force adjustment means comprises:
a first differential gear and a second differential gear being supported rotatably relatively to each other and being different from each other in number of teeth;
a torque cam that converts relative rotation between the first differential gear and the second differential gear into axial thrust;
a clutch pinion meshing with the first differential gear and the second differential gear and receiving rotation input from the clutch actuator;
an elastic body generating pressing force for the fastening; and
a pressing force adjustment member that receives the pressing force of the elastic body to conduct the fastening and receives the axial thrust converted by the torque cam to reduce the pressing force of the elastic body.

8. A two-speed transmission using the meshing clutch mechanism according to claim 2, comprising:
an input shaft being provided with a low-speed drive gear and a high-speed drive gear and being configured to receive rotation input;
an output shaft being provided with a low speed driven gear meshing with the low-speed drive gear, a high-speed driven gear meshing with the high-speed drive gear, and a drive pinion for output;
the input shaft or the output shaft forming the torque transmission shaft;
in a case of the input shaft forming the torque transmission shaft, the low-speed drive gear forming the rotor and the low-speed driven gear being fixed to the output shaft;
in a case of the output shaft forming the torque transmission shaft, the low-speed driven gear being the rotor and the low-speed drive gear being fixed to the input shaft;
a friction clutch mechanism that adjusts connection between the input shaft and the high-speed drive gear provided rotatably on the input shaft or that adjusts connection between the output shaft and the high-speed driven gear provided rotatably on the output shaft; and
a clutch actuator that adjusts frictional torque of the connection according to fastening control of the friction clutch mechanism.

9. The two-speed transmission according to claim 8, further comprising:
a pressing force adjustment means between the clutch actuator and the friction clutch mechanism to conduct the fastening, wherein
the pressing force adjustment means comprises:
an elastic body that generates pressing force for the fastening; and
a pressing force adjustment member connected to the clutch actuator and configured to receive the pressing force of the elastic body to conduct the fastening, wherein
the clutch actuator drives the pressing force adjustment member to adjust the pressing force of the elastic body.

10. A two-step transmission using the meshing clutch mechanism according to claim 1, comprising:
a sun gear that receives rotation input;
an internal gear meshing with the sun gear through a planet pinion and forming the rotor;
a planet carrier supported rotatably relatively to the internal gear and rotatably supporting the planet pinion;
a fiction clutch mechanism interposed between the internal gear and the planet carrier to adjust connection between the internal gear and the planet carrier according to fastening;
a clutch actuator that adjusts frictional torque of the connection according to fastening control of the friction clutch mechanism; and
an output shaft connected to the planet carrier and arranged so as to be protruded outside.

11. A two-step transmission using the meshing clutch mechanism according to claim 1, comprising:
a sun gear that receives rotation input;
a third sun gear being provided with an output shaft arranged so as to be protruded outside;
a planet pinion being integrally provided with a first gear meshing with the sun gear and a second gear meshing with the third sun gear;
a planet carrier rotatably supporting the planet pinion and forming the rotor;

a fiction clutch mechanism interposed between the sun gear and the planet carrier to adjust connection between the sun gear and the planet carrier according to fastening; and a clutch actuator that adjusts frictional torque of the connection according to the fastening of the friction clutch mechanism.

12. The two-speed transmission according to claim 3, further comprising:

a sensor that detects a slip of the friction clutch mechanism; and a controller that controls the clutch actuator according to the detected slip.

* * * * *